(12) United States Patent
Nakano

(10) Patent No.: US 6,363,456 B1
(45) Date of Patent: Mar. 26, 2002

(54) IC CARD, IC CARD PROCESSING SYSTEM, AND IC CARD PROCESSING METHOD

(75) Inventor: Hiroo Nakano, Yokohama (JP)

(73) Assignee: Kabushiki Kaisha Toshiba, Sai wai (JP)

(*) Notice: Subject to any disclaimer, the term of this patent is extended or adjusted under 35 U.S.C. 154(b) by 0 days.

(21) Appl. No.: 09/353,662

(22) Filed: Jul. 15, 1999

(30) Foreign Application Priority Data

Jul. 16, 1998 (JP) .......................................... 10-201805

(51) Int. Cl.[7] ............................................. G06F 12/00
(52) U.S. Cl. ........................ 711/103; 711/104; 711/173
(58) Field of Search ................................ 711/104, 103, 711/173

(56) References Cited

U.S. PATENT DOCUMENTS 5,590,306 A * 12/1996 Watanabe et al. ........... 711/115
5,699,549 A * 12/1997 Cho .............................. 711/115
6,023,710 A * 2/2000 Steiner et al. ................ 707/204

FOREIGN PATENT DOCUMENTS

| EP | 583 006 | 2/1994 |
| EP | 0583006 A2 * | 2/1994 |
| EP | 644 513 | 3/1995 |
| EP | 817 115 | 1/1998 |

* cited by examiner

Primary Examiner—Matthew M. Kim
Assistant Examiner—Pierre M. Vital
(74) Attorney, Agent, or Firm—Pillsbury Winthrop LLP

(57) ABSTRACT

An IC card according to the present invention includes a communication section for receiving externally transmitted data, a storage section for storing a file and definition information of the file, and a delete section for, when the data received through the communication section is a command to delete a predetermined file, deleting the predetermined file and definition information of the predetermined file from the storage section.

10 Claims, 30 Drawing Sheets

| (NAME) | (BYTE COUNT) | (CONTENTS) |
|---|---|---|
| GBUFFEFTOP | 2 | TOP ADDRESS OF DATA BACKUP EF |
| GBUFFLC | 2 | SIZE OF BACKUP AREA (GUFFE) FOR EF |
| DELDFSN | 1 | DF-NO. OF DELETE TARGET DIRECTORY |
| DELPFSN | 1 | PARENT DF-NO. OF DELETE TARGET DIRECTORY |
| DELFSIZ | 2 | DEFINITION SIZE INFORMATION OF DELETE TARGET DIRECTOR |
| GSTGR | 1 | STAGE NO. OF COMMAND |
| X0R | 2 | POINTER:ADDRESS OF DEFINITION INFORMATION THAT HAS BEEN MOVED |
| Y0R | 2 | POINTER:ADDRESS OF DATA AREA THAT HAS BEEN MOVED |
| X1R | 2 | POINTER:ADDRESS OF DEFINITION INFORMATION OF DELETE TARGET EF |
| X2R | 2 | POINTER:ADDRESS OF DEFINITION INFORMATION OF EF THAT IS NOT TO BE DELETED |
| PY1R | 2 | POINTER:ADDRESS OF DIVISIONAL MOVEMENT DESTINATION OF DATA AREA |
| PY2R | 2 | POINTER:ADDRESS OF DIVISIONAL MOVEMENT SOURCE OF DATA AREA |
| LCR | 2 | SIZE OF DATA TO BE MOVED |
| Y2TOP | 2 | TOP ADDRESS OF DATA AREA FOR EF TO BE MOVED |
| Y2SIZE | 2 | SIZE OF EF TO BE MOVED |
| GCONTR | 1 | WTX REQUEST PROCESSING COUNTER |
| GBUFFR | WDLEN~255 | TEMPORARY DATA STORAGE AREA (FOR WRITE IN EEPROM) |

※USE AREA IS BUFFER SIZE (GBUFFR)+28 BYTES

FIG.11

| (NAME) | (BYTE COUNT) | (CONTENTS) |
|---|---|---|
| FLAG0 | 1 | COMMAND PROCESSING FLAG |
| FLAG1 | 1 | DATA BACKUP COMPLETION FLAG |
| FLAG2 | 1 | DATA UPDATE COMPLETION FLAG |
| DELDFSNE | 1 | DF-NO. OF DELETE TARGET DIRECTORY |
| DELPFSNE | 1 | PARENT DF-NO. OF DELETE TARGET DIRECTORY |
| DELFSIZE | 2 | DEFINITION SIZE INFORMATION OF DELETE TARGET DIRECTORY |
| GSTGE | 1 | STAGE NO. OF COMMAND |
| X0E | 2 | POINTER:ADDRESS OF DEFINITION INFORMATION THAT HAS BEEN MOVED |
| Y0E | 2 | POINTER:ADDRESS OF DATA AREA THAT HAS BEEN MOVED |
| X1E | 2 | POINTER:ADDRESS OF DEFINITION INFORMATION OF DELETE TARGET EF |
| X2E | 2 | POINTER:ADDRESS OF DEFINITION INFORMATION OF EF THAT IS NOT TO BE DELETED |
| PY1E | 2 | POINTER:ADDRESS OF DIVISIONAL MOVEMENT DESTINATION OF DATA AREA |
| PY2E | 2 | POINTER:ADDRESS OF DIVISIONAL MOVEMENT SOURCE OF DATA AREA |
| LCE | 2 | SIZE OF DATA TO BE MOVED |
| GBUFFE | WDLEN~255 | DATA BACKUP AREA (TEMPORARY DATA UPDATE AREA) |

※USE AREA IS BUFFER SIZE (GBUFFR)+22 BYTES

FIG. 12

| (NAME) | (BYTE COUNT) | (CONTENTS) |
|---|---|---|
| DIRP1 | 2 | LOWEST ADDRESS OF AVAILABLE MEMORY AREA |
| DIRP2 | 2 | LOWEST ADDRESS OF DATA AREA |
| DFSEQNO | 4 | DF SEQUENCE NO. (BITMAP MANAGEMENT) |

FIG. 13

DURING OR END OF COMMAND PROCESSING

| FLAG0 | FLAG1 | FLAG2 | COMMAND EXECUTION STATUS |
|---|---|---|---|
| 80 | XX | XX | COMMAND PROCESSING IN PROGRESS (INTERRUPTION HISTORY) |
| 00 | XX | XX | NORMAL COMMAND END |

STAGES 01, 04, 81, AND 84

| FLAG0 | FLAG1 | FLAG2 | COMMAND EXECUTION STATUS |
|---|---|---|---|
| 80 | 80 | 80 | COMPLETION OF POINTER UPDATE |
| 80 | 00 | 80 | FLAG CLEARING |
| 80 | 00 | 00 | |
| 80 | 80 | 00 | COMPLETION OF POINTER BACKUP OPERATION |

STAGES 02, 82, 20, AND 40

| FLAG0 | FLAG1 | FLAG2 | COMMAND EXECUTION STATUS |
|---|---|---|---|
| 80 | 80 | 80 | COMPLETION OF POINTER UPDATE |
| 80 | 00 | 80 | COMPLETION OF DATA AREA BACKUP OPERATION |
| 80 | 00 | 00 | COMPLETION OF DATA AREA UPDATE |
| 80 | 80 | 00 | COMPLETION OF POINTER BACKUP OPERATION |

| WAI | PFSN | (OTHER INFORMATION) | DFSN | (DF NAME, OTHER INFORMATION) |
|---|---|---|---|---|

| WAI | DFSN | (OTHER INFORMATION) | FSIZ | USIZ | (OTHER INFORMATION) |
|---|---|---|---|---|---|

FIG. 39

| WAI | DFSN | (OTHER INFORMATION) | FSIZ | USIZ | (OTHER INFORMATION) |
|---|---|---|---|---|---|

FIG. 40

| WAI | DFSN | (OTHER INFORMATION) | EFTOP | EFSIZ | (OTHER INFORMATION) |
|---|---|---|---|---|---|

IC CARD, IC CARD PROCESSING SYSTEM, AND IC CARD PROCESSING METHOD

BACKGROUND OF THE INVENTION

The present invention relates to an IC card for receiving a command transmitted from a card reader/writer and executing processing in accordance with the received command.

The present invention also relates to an IC card processing system including a card reader/writer for transmitting a command to an IC card and the IC card for receiving a command transmitted from the card reader/writer and executing processing in accordance with the received command.

In addition, the present invention relates to an IC card processing method applied to an IC card for receiving a command transmitted from a card reader/writer and executing processing in accordance with the received command.

Attention has recently been given to an IC card as a portable information storage medium. This IC card incorporates an IC chip including a nonvolatile memory and control section. Files for executing various applications are stored in the nonvolatile memory.

The IC card receives a command transmitted from a card reader/writer and executes a predetermined application in accordance with the command. That is, the IC card reads out predetermined files from the nonvolatile memory and executes the predetermined application.

In addition, a new application can be added to the IC card by storing new files in the nonvolatile memory of the IC card through the card reader/writer.

Obviously, there is a limit to the available capacity of the nonvolatile memory of the IC card, and so is to applications that can be added to the IC card. This impairs the versatility of the IC card.

BRIEF SUMMARY OF THE INVENTION

The present invention has been made to solve the above problem, and has as its object to provide an IC card, IC card processing system, and IC card processing method which can solve the problem of a shortage of memory capacity upon addition of a new application.

According to the present invention, there is provided an IC card comprising communication means receiving externally transmitted data, storage means for storing a file and definition information of the file, and delete means for, when the data received through the communication means is a command to delete a predetermined file, deleting the predetermined file and definition information of the predetermined file from the storage means.

In addition, the IC card processing system of the present invention comprises storage means for storing a file and definition information of the file, and delete means for deleting the predetermine file and the definition information of the predetermined file from the storage means.

Furthermore, according to the present invention, there is provided an IC card processing method comprising the first step of receiving externally transmitted data and the second step of, when the data received in the first step is a command to delete the predetermined file, deleting the predetermined file and definition information of the predetermined file from the data storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a view showing a list of data names, data sizes (byte counts), data contents stored in the working area of a working memory;

FIG. 12 is a view showing a list of data names, data sizes (byte counts), data contents stored in the backup area of a data memory;

FIG. 13 is a view showing a list of data names, data sizes (byte counts), data contents stored in the system area of the data memory;

FIG. 37 is a view showing the relationship between flag data and execution statuses;

FIG. 38 is a view showing an example of DF definition information;

FIG. 39 is a view showing an example of MF definition information; and

FIG. 40 is a view showing an example of EF definition information.

DETAILED DESCRIPTION OF THE INVENTION

An embodiment of the present invention will be described below with reference to the views of the accompanying drawing.

Figure 1:
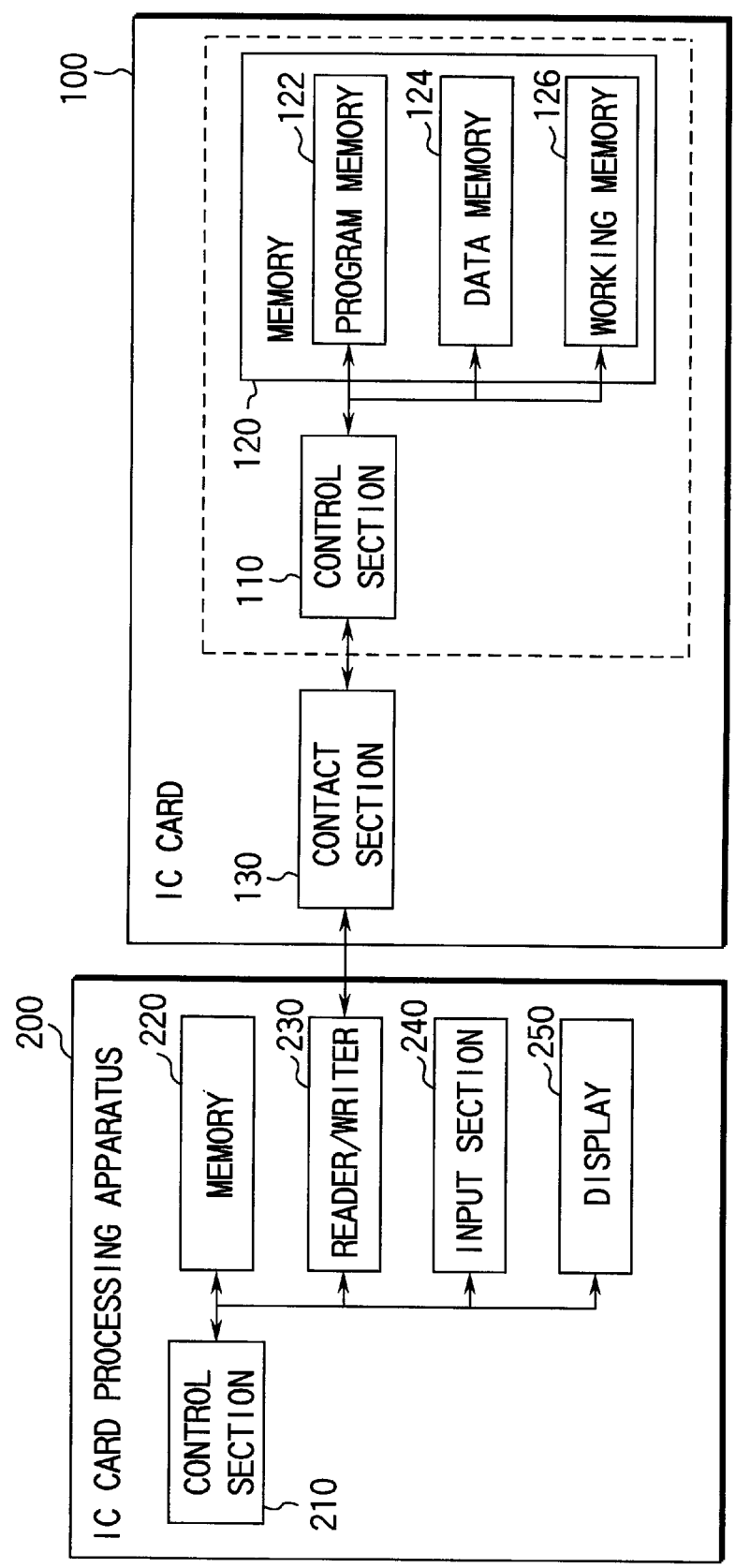
FIG. 1 is a block diagram showing the schematic arrangement of an IC card processing system of the present invention.

FIG. 1 is a block diagram showing the schematic arrangement of an IC card processing system of the present invention. As shown in FIG. 1, the IC card processing system includes an IC card 100 and IC card processing apparatus 200.

The IC card 100 incorporates a control section 110, memory 120, and contact section 130. Of these components, the control section 110 and memory 120 are embedded as IC chips in the card.

The control section 110 is, for example, a CPU and executes predetermined processing in accordance with the programs stored in a program memory 122 of the memory 120. This predetermined processing includes directory delete processing. That is, the control section 110 functions as a delete means and delete control means.

The memory 120 includes the program memory 122, a data memory 124, and working memory 126.

The program memory 122 is, for example, a mask ROM. Programs and the like required for execution of predetermined processing by the control section 110 are recorded on the program memory 122. That is, programs required for directory delete processing are also recorded on the program memory 122.

Figure 2:
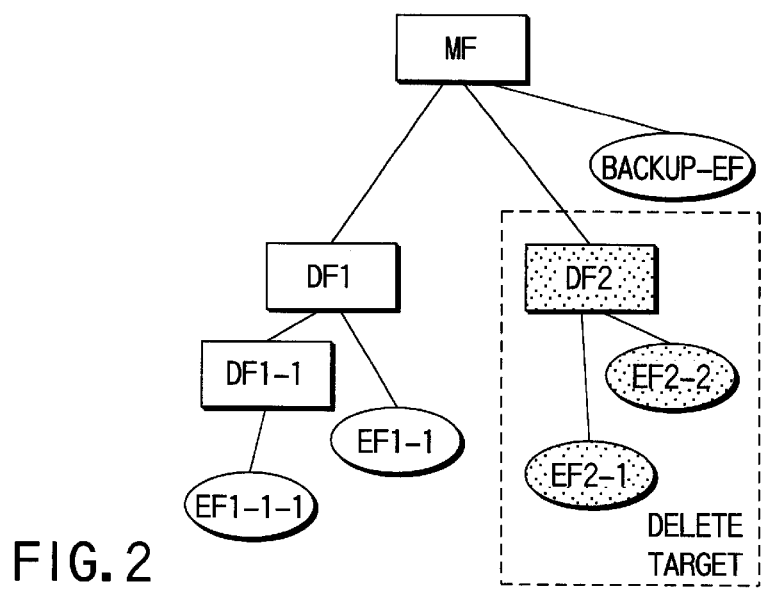
FIG. 2 is view for explaining an outline of a file structure constructed in the data memory of an IC card in FIG. 1.

The data memory 124 (storage means) is, for example, an EEPROM. Application files and the like for implementing various applications are stored in the data memory 124. More specifically, definition information for constructing a file structure like the one shown in FIG. 2 is stored in the data memory 124. The application files are managed under this file structure. The file structure shown in FIG. 2 will be briefly described below. DF (dedicated file)1 and DF2 are positioned below MF (main file). DF1-1 and EF (elementary file)1-1 are positioned below DF1. EF1-1-1 is positioned below DF1-1. EF2-1 and EF2-2 are positioned below DF2. For example, EF1-1 and EF1-1-1 include application files (ef1-1 and ef1-1-1) for implementing a first application. EF2-1 and EF2-2 include application files (ef2-1 and ef2-2) for implementing a second application different from the first application. Note that the relationship between DF and EF corresponds to that between a main file and subfile.

The working memory 126 is, for example, a RAM. Data to be processed by the control section 110 and the like are temporarily stored in the working memory 126.

The contact section 130 (communication means) comes into electric contact with a reader/writer 230 of the IC card processing apparatus 200 to provide data stored in the IC card 100 to the reader/writer 230 or receive data provided from the reader/writer 230.

The IC card processing apparatus 200 is used as a terminal apparatus in a financial system or shopping system. As the IC card processing apparatus 200, a tabletop type that is installed in a store or a portable type is available. The IC card processing apparatus 200 includes a control section 210, memory 220, reader/writer 230, input section 240, and display 250.

The control section 210 is, for example, a CPU and executes predetermined processing in accordance with the programs stored in the memory 220. For example, the predetermined processing includes command generation processing of generating a select command and directory delete command. That is, the control section 210 functions as a command generation means for generating commands.

Programs required for execution of predetermined processing by the control section 210 are stored in the memory 220. For example, a program required to execute command generation processing is stored in the memory 220.

The reader/writer 230 (communication means) reads out data from the IC card 100 or writes data thereon through the contact section 130.

The input section 240 receives an input from the operator of the IC card processing apparatus 200. For example, the input section 240 receives a size setting (change) for a backup area (to be described later). Setting (changing) of a backup area size is designated with respect to the IC card 100 through the reader/writer 230 on the basis of the backup area size setting (change) received by the input section 240. On the IC card 100 side, the size of the backup area is determined on the basis of this designation. That is, the input section 240 has the function of changing the size of the backup area.

The display 250 displays, for example, data read out from the IC card 100.

Deletion of application files stored in the data memory 124 of the above IC card will be described next.

According to the present invention, by deleting a predetermined directory (DF in FIG. 2), subdirectories (EF)

positioned below the predetermined directory are deleted. There are two methods of deleting applications: a method of deleting current DF; and a method of deleting designated DF.

In either of the delete methods, a command output from the IC card processing apparatus 200 must be received on the IC card 100 side. That is, the IC card 100 must be set in the IC card processing apparatus 200. When the IC card 100 is set in the IC card processing apparatus 200, the files in the data memory 124 of the IC card 100 can be accessed through the IC card processing apparatus 200.

When, for example, file selection of DF2 is designated through the input section 240, a select command is generated under the control of the control section 210, and the generated select command and file name (DF2) are transmitted from the reader/writer 230 to the contact section 130. When the contact section 130 receives the select command and file name (DF2), the file having the file name (DF2) sent together with the select command is selected from the data memory 124 and a response indicating that the file has been selected is transmitted to the reader/writer 230 through the contact section 130 under the control of the control section 110. The control section 110 also recognizes the selected file (DF2) as the current file. The control section 210 receives the response corresponding to the previously transmitted select command through the reader/writer 230, and outputs the received response to the display 250.

When deletion of a current DF is designated through the input section 240, a directory delete command is generated under the control of the control section 210, and only the generated directory delete command is transmitted from the reader/writer 230 to the contact section 130. When the contact section 130 receives only the directory delete command, the current file (DF2 in this case) stored in the data memory 124 is deleted under the control of the control section 110. That is, when the current file (DF2 in this case) is detected, the subfiles (EF2-1 and EF2-2) positioned below the current file are deleted. When the current file (DF2 in this case) is completely deleted, the file (MF in this case) positioned above the deleted current file is recognized as the current file.

Deletion of a designated DF (for example, DF2) will be described next. When deletion of DF2 is designated through the input section 240, a directory delete command is generated under the control of the control section 210, and the generated directory delete command and file name (DF2) are transmitted from the reader/writer 230 to the contact section 130. When the contact section 130 receives the directory delete command and file name (DF2), the file having the file name (DF2) sent together with the directory delete command is deleted from the data memory 124 under the control of the control section 110. That is, when the designated file (DF2 in this case) is deleted, the subfiles (EF2-1 and EF2-2 in this case) positioned below the designated file are deleted.

The flow of deletion of DF2 will be described in detail below.

The above directory delete command will be further described below. The directory delete command is a command used to delete a predetermined directory (e.g., DF2, which is assumed as a main file) and the subdirectories (e.g., EF2-1 and EF2-2, which are assumed as subfiles) positioned below the predetermined directory and release the memory area occupied by the deleted directory (including the subdirectories). When an unnecessary application is deleted from the IC card 100 by deleting a corresponding directory (including subdirectories) and releasing the memory area using this directory delete command, a new application can be added to the released memory area.

Figure 3:
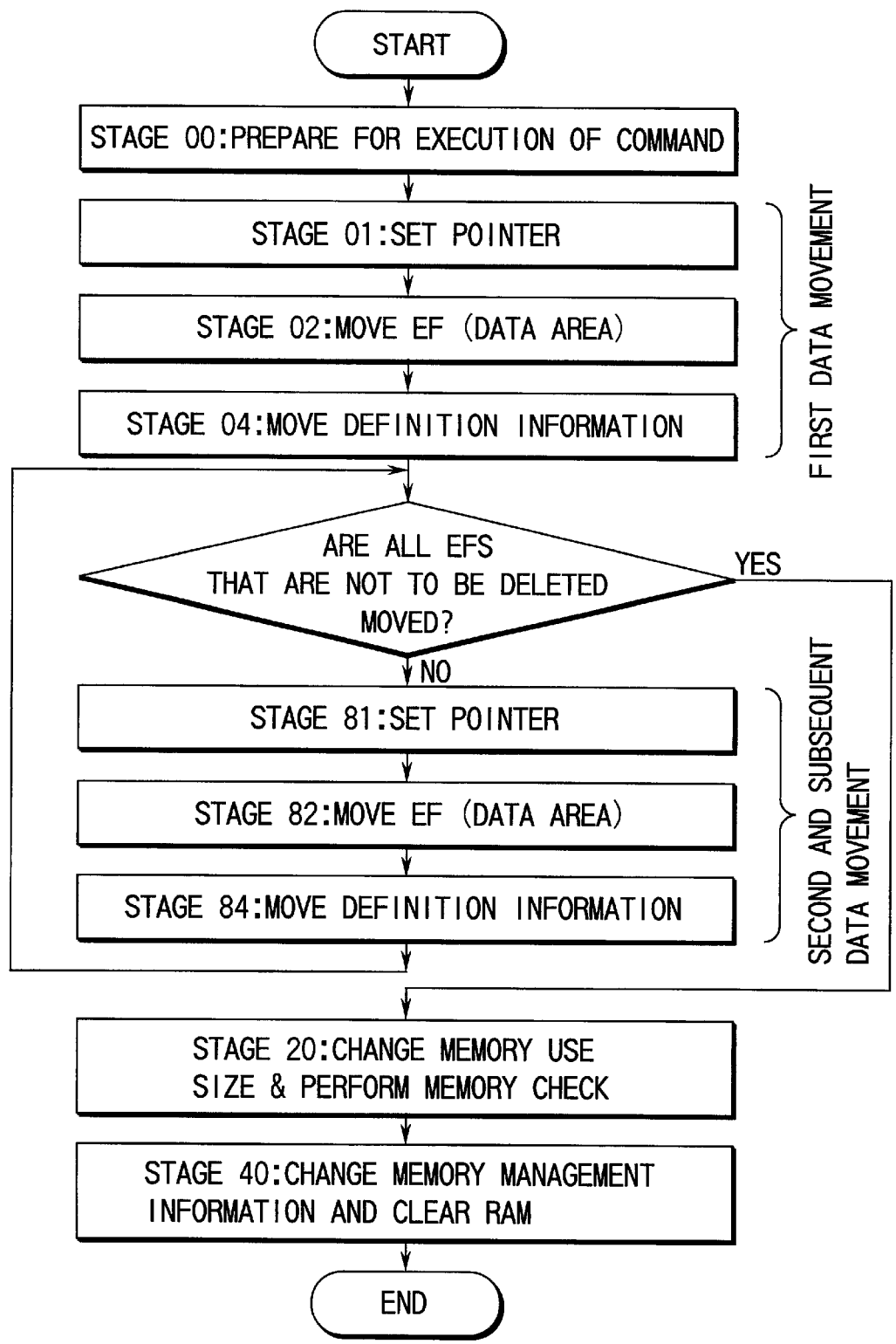
FIG. 3 is a flow chart showing an outline of overall directory delete processing based on a directory delete command.

The flow of deletion of DF2 and release of a memory area will be described in detail next with reference to FIGS. 3 to 11. FIG. 3 is a flow chart showing an outline of directory delete processing using a directory delete command.

As shown in FIG. 3, directory delete processing using a directory delete command is implemented by nine stages. During execution of directory delete processing, a stage number (a log of processing such as stage 00) is saved in the backup area (backup-EF or backup-ef in FIGS. 4 to 10) of the data memory 124. More specifically, as processing proceeds, i.e., every time the stage number is updated, the updated stage number is saved in the backup area of the data memory 124. Definition information, real data, and the like are also saved in the backup area. More specifically, when definition information and real data are to be relocated, the definition information and real data are saved in the backup area. With this operation, even if directory delete processing is interrupted due to accidental power-down or reset, the directory delete processing can be re-executed after a normal return.

Each stage of the flow chart in FIG. 3 will be described next with reference to the memory maps in FIGS. 4 to 10. To facilitate understanding of the following description, consider deletion of DF2 in the file structure in FIG. 2 with reference to FIGS. 4 to 10. In other words, a case wherein DF2 in the file structure in FIG. 2 is deleted by using a directory delete command will be described.

Figure 4:
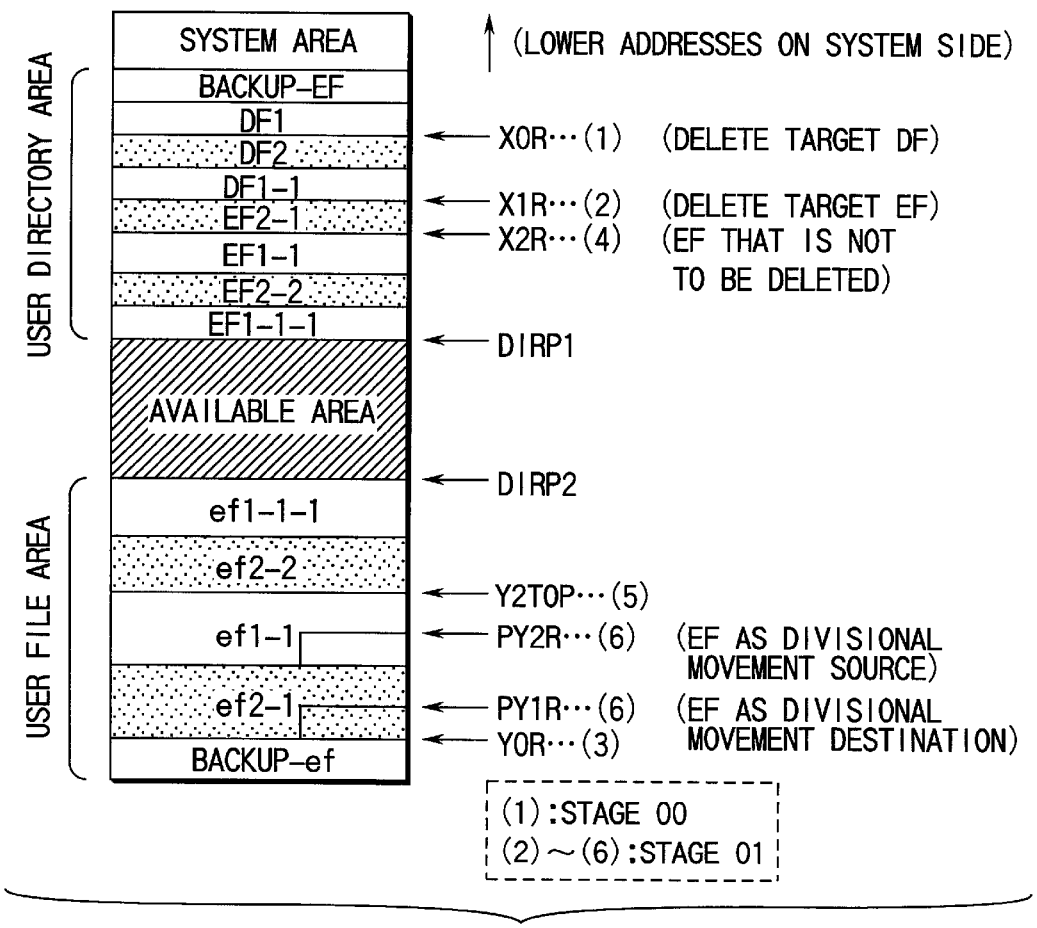
FIG. 4 is a memory map for explaining stages 00 and 01 in the flow chart of FIG. 3.
Figure 5:
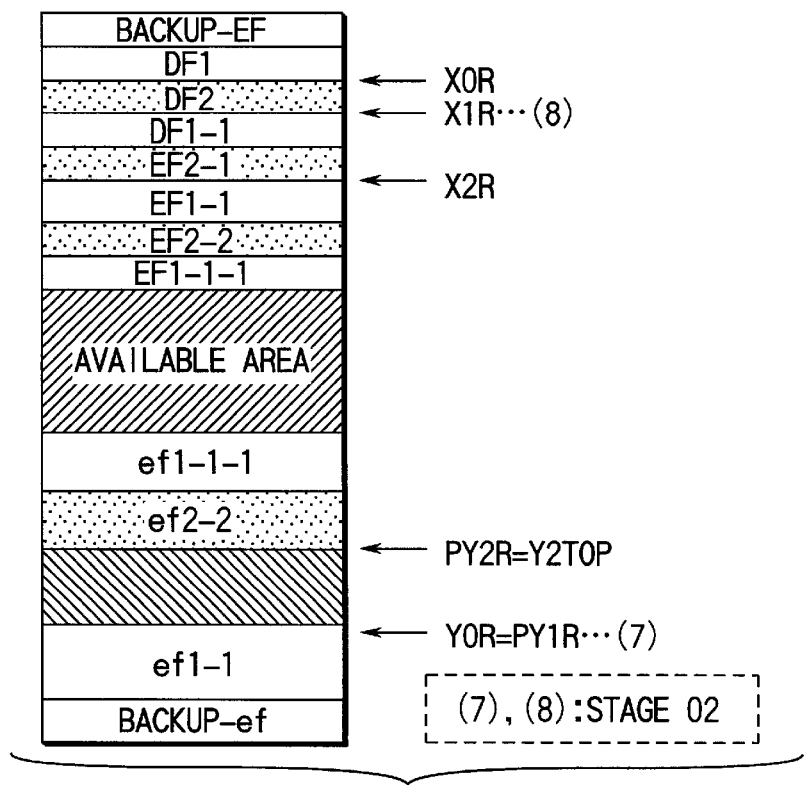
FIG. 5 is a memory map for explaining stage 02 in the flow chart of FIG. 3.
Figure 6:
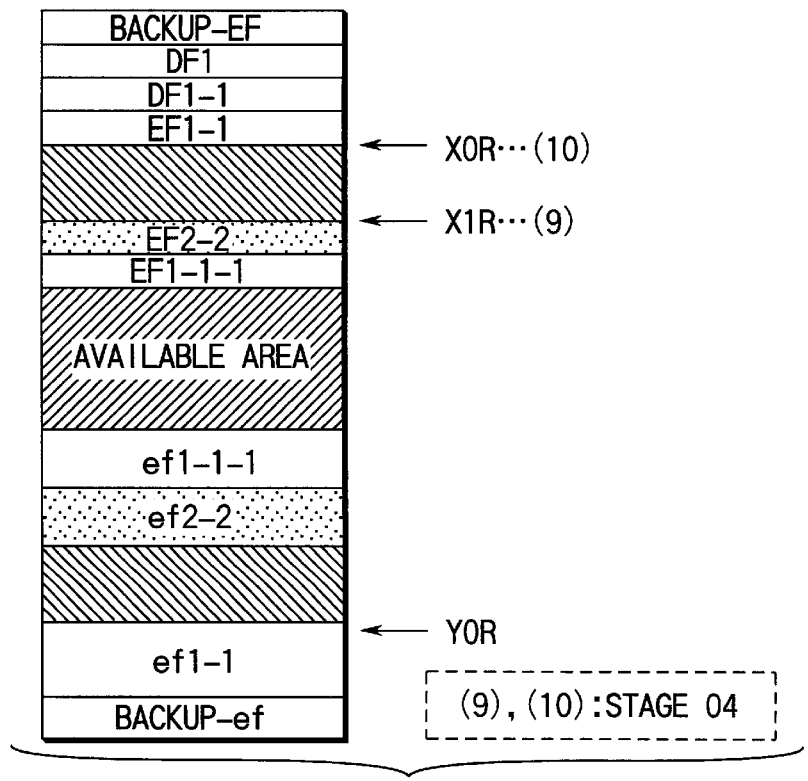
FIG. 6 is a memory map for explaining stage 04 in the flow chart of FIG. 3.
Figure 7:
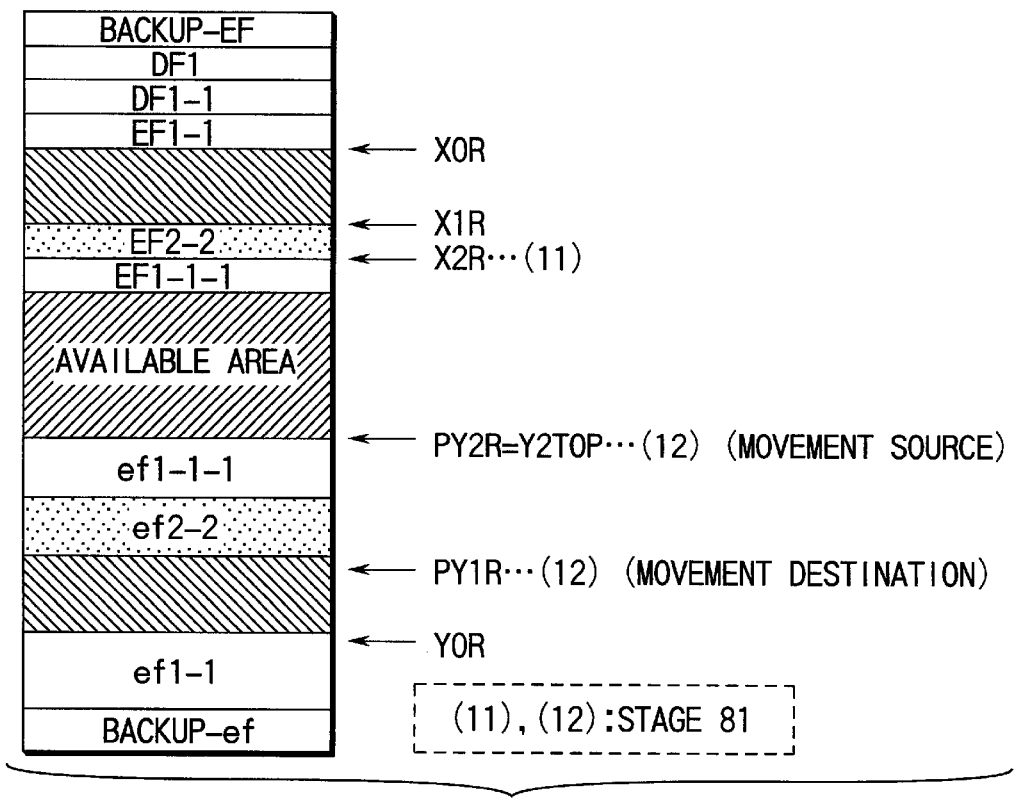
FIG. 7 is a memory map for explaining stage 81 in the flow chart of FIG. 3.
Figure 8:
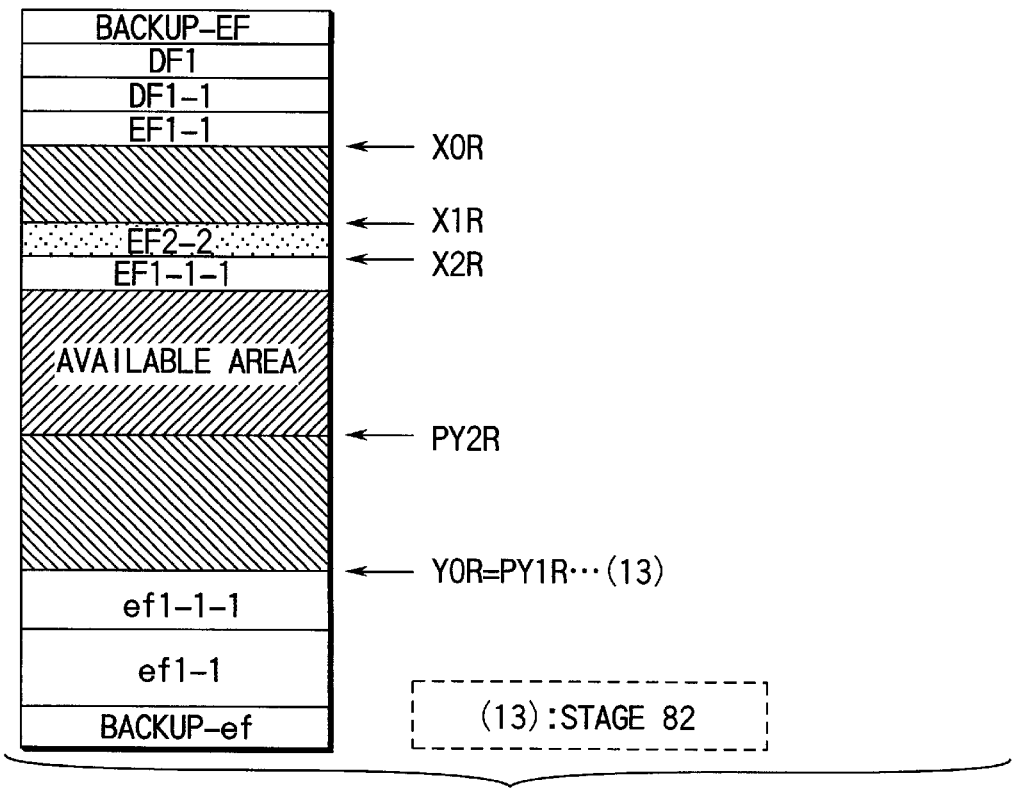
FIG. 8 is a memory map for explaining stage 82 in the flow chart of FIG. 3.
Figure 9:
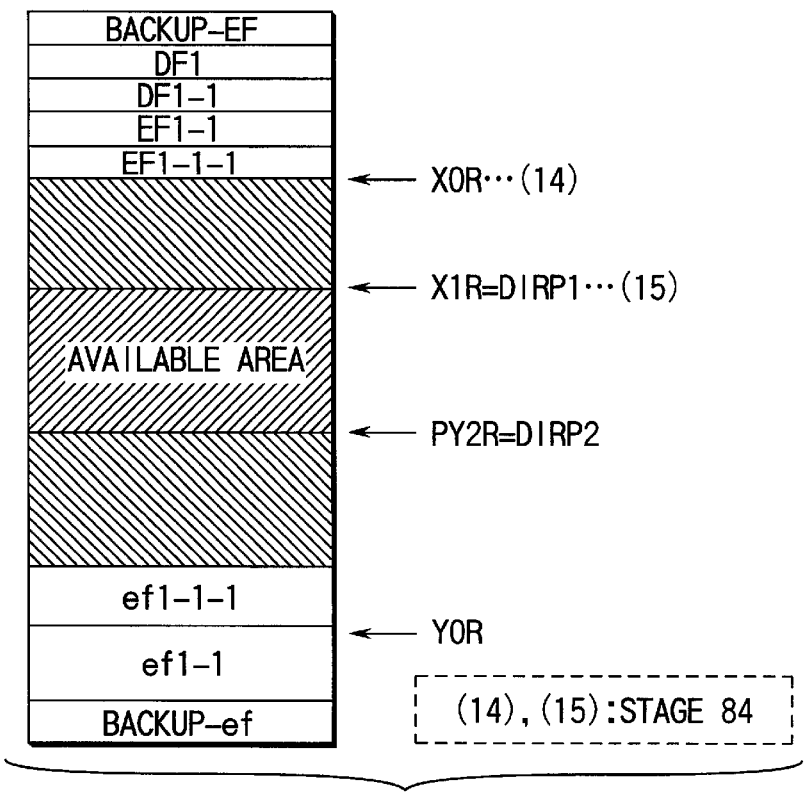
FIG. 9 is a memory map for explaining stage 84 in the flow chart of FIG. 3.
Figure 10:
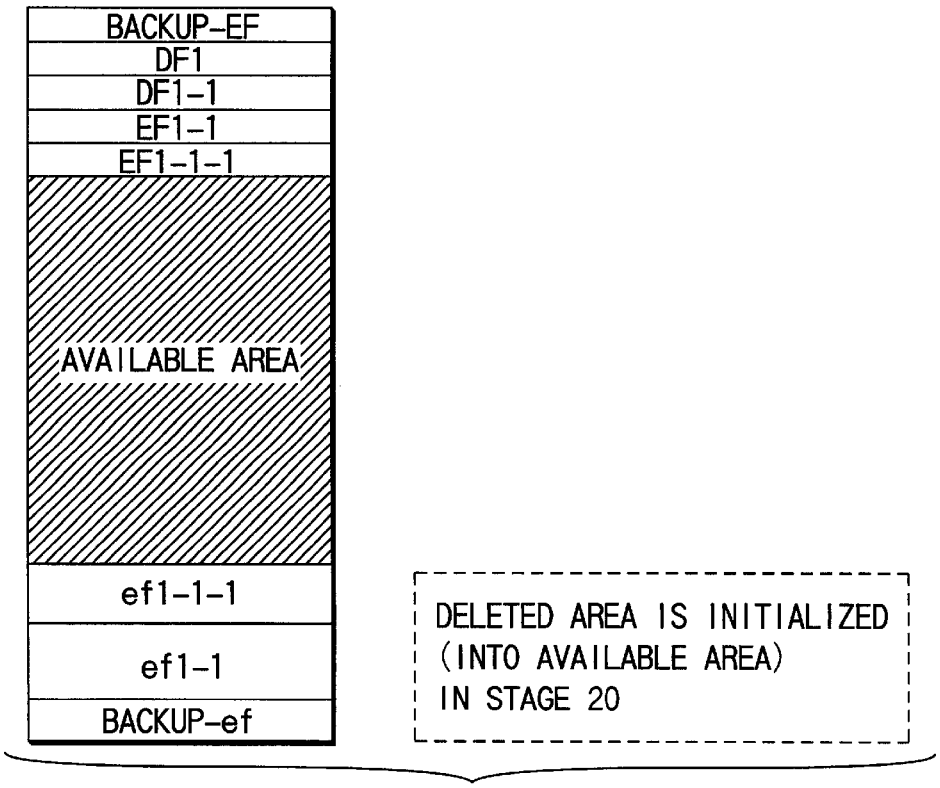
FIG. 10 is a memory map for explaining stage 20 in the flow chart of FIG. 3.

FIG. 4 is a view for explaining stages 00 and 01 in the flow chart of FIG. 3. FIG. 5 is a view for explaining stage 02 in the flow chart of FIG. 3. FIG. 6 is a view for explaining stage 04 in the flow chart of FIG. 3. FIG. 7 is a view for explaining stage 81 in the flow chart of FIG. 3. FIG. 8 is a view for explaining stage 82 in the flow chart of FIG. 3. FIG. 9 is a view for explaining stage 84 in the flow chart of FIG. 3. FIG. 10 is a view for explaining stage 20 in the flow chart of FIG. 3.

FIG. 11 shows a list of data names, data sizes (byte counts), and data contents stored in the working area of the working memory 126. Assume that the data shown in FIG. 11 are sequentially stored in this working area in the order of upper addresses. FIG. 12 shows a list of data names, data sizes (byte counts), and data contents stored in the backup area of the data memory 124. Assume that the data shown in FIG. 12 are sequentially stored in this backup area in the order of upper addresses. FIG. 13 shows a list of data names, data sizes (byte counts), and data contents stored in the system area of the data memory 124.

Stage 00: Preparation for Execution of Command

Upon recognition of a directory delete command, the control section 110 prepares for execution of the directory delete command. In making one of preparations for this execution, the control section 110 stores address X0R in FIG. 4 in a pointer. Address X0R indicates the start address of the definition information of DF2. The pointer stores the addresses of a delete target file (to be deleted) and other files (ef and the like) and the addresses of the pieces of definition information of the delete target file and other files (DF, EF). The pointer is set in the backup area of the memory 220 (see FIG. 11).

Stage 01: Setting of Pointer

In stage 01, as shown in FIG. 4, address X1R, address X2R, address Y2TOP, address PY2R, address PY1R, and address Y0R are stored in the pointer. Address X1R indicates the definition information of EF2-1. Address X2R indicates the start address of the definition information of EF1-1. Address Y2TOP indicates the start address of ef1-1 (application file). Address PY2R indicates the start address of part of ef1-1 (application file). Address PY1R indicates the start address of part of ef2-1 (application file). Address Y0R indicates the start address of backup-ef.

Stage 02: Movement of ef (Execution Data)

In stage 02, as shown in FIG. 5, ef2-1 is deleted, ef1-1 is moved, and the addresses are updated. Note that ef1-1 is divided and moved (see FIG. 4).

Stage 04: Movement of EF (Definition Information)

In stage 04, as shown in FIG. 6, DF2 and EF2-1 are deleted upon deletion of ef2-1, DF1-1 and EF1-1 are moved, and the addresses are updated.

Stage 81: Setting of Pointer

In stage 81, the addresses shown in FIG. 7 are stored in the pointer.

Stage 82: Movement of ef (Execution Data)

In stage 82, as shown in FIG. 8, ef2-2 is deleted, ef1-1-1 is moved, and the addresses are updated. Note that ef1-1-1 is divided and moved.

Stage 84: Movement of EF (Definition Information)

In stage 04, as shown in FIG. 9, EF2-2 is deleted upon deletion of ef2-2, EF1-1-1 is moved, and the addresses are updated.

Stage 20: Memory Use Size Change & Memory Check

In stage 20, as shown in FIG. 10, an available area is initialized (memory area is released). With this operation, a new storage area can be ensured.

In addition, a location like the one shown in FIG. 4 is realized under the control of the control section 110. More specifically, when definition information (DF, EF) is to be stored, the definition information is sequentially located from one end of the storage area of the data memory 124. When read data (ef) is to be stored, the read data is sequentially located from the other end of the storage area of the data memory 124. That is, the control section 110 functions as a location means.

Upon deletion of definition information, definition information is sequentially relocated from one end of the storage area under the control of control section 110. Upon deletion of real data, read data is sequentially relocated from the other end of the storage area under the control of the control section 110. That is, the control section 110 functions as a storage position control means.

As described above, the control section 110 controls the storage positions of definition information and real data, as shown in FIGS. 4 to 10. To locate and relocate such definition information and real data, address data indicating the locations of the definition information and real data are always managed and backed up in the backup area. Furthermore, these address data are updated upon relocation of definition information and real data and are backed up in the backup area at this update timing.

The flow chart in FIG. 3 exemplifies the case wherein real data and definition information are alternately deleted and relocated. However, the present invention is not limited to this. For example, after all the real data as delete target data are deleted and other data are relocated, all definition information as delete target information may be deleted and other information may be relocated.

Figure 15:
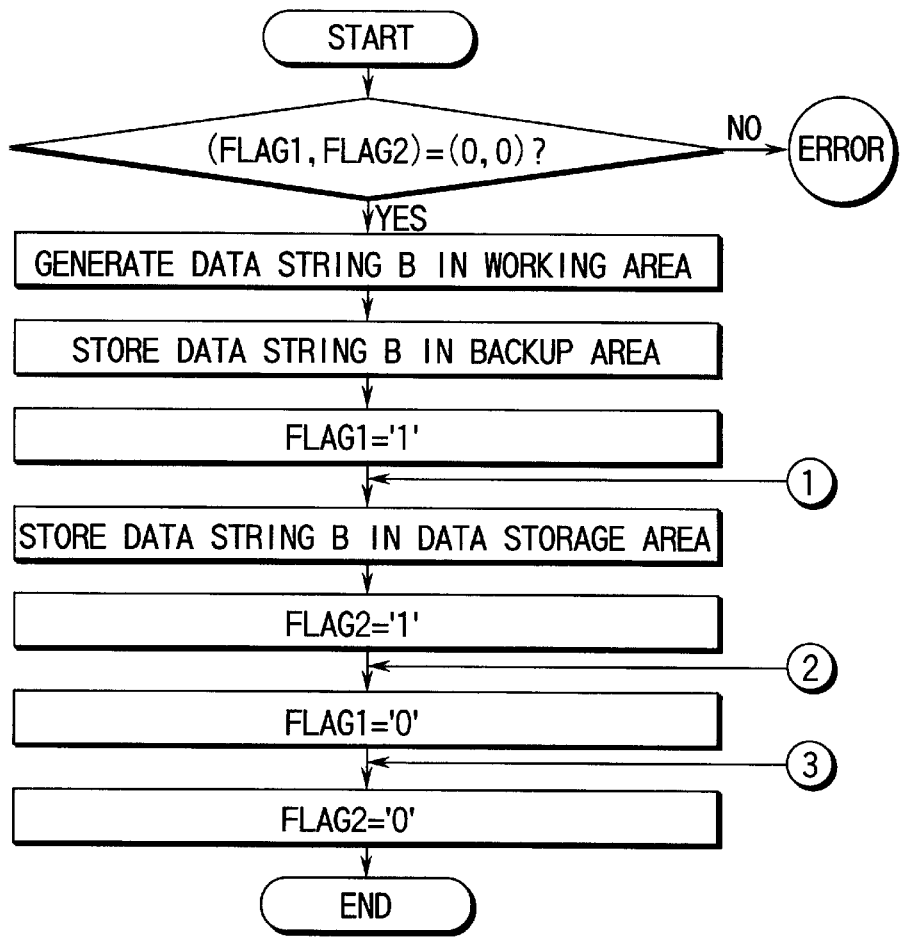
FIG. 15 is a flow chart for explaining data update processing.
Figure 16:
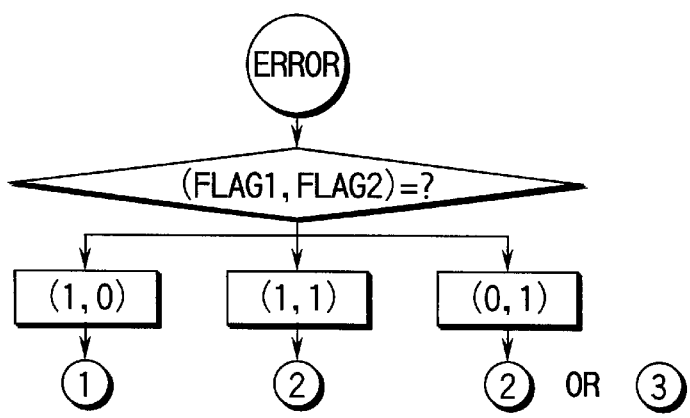
FIG. 16 is a flow chart showing part of the flow chart in FIG. 15 to explain data update processing.

A data update method will be described in more detail next with reference to FIGS. 14 to 16.

In directory delete processing using a directory delete command, when data is to be written in the backup area of the data memory 124, flags (FLAG1 and FLAG2) assigned to memory cells are used. These flags are used to record a command processing history in preparation for power-down during execution of a command. When power-down occurs during data write, in particular, data cannot be compensated for. Therefore, careful consideration must be given to such operation.

When the flag data is $80, the flag represents 1. When the flag data is $00, the flag represents 0. As described above, however, when a drop in power supply voltage or reset occurs during a flag rewrite, you cannot know how the flag data will change. For this reason, with the flag data other than $80, the flag is regarded as 0.

Figure 14:
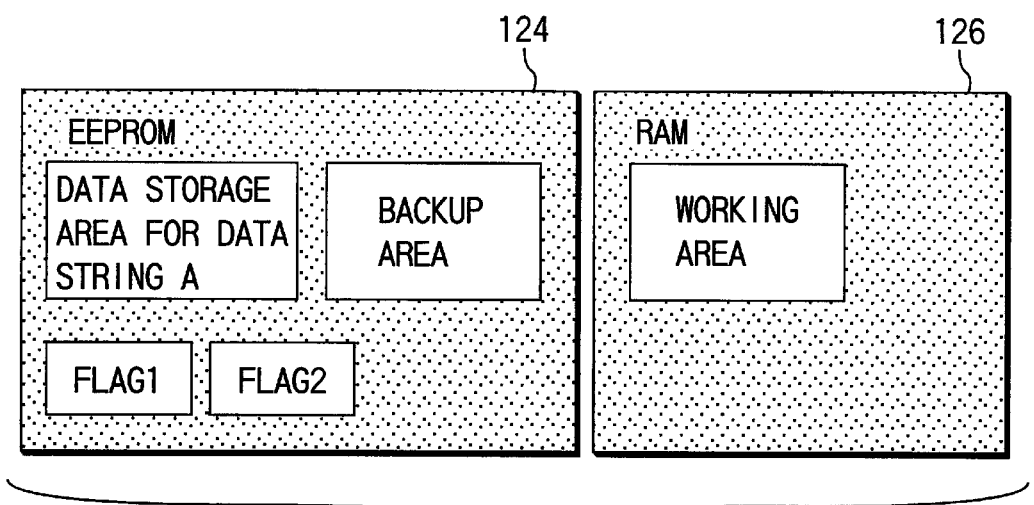
FIG. 14 is a memory map for explaining data update processing.

In directory delete processing using a directory delete command, as shown in FIG. 14, data is updated by using the two flags and the data backup area. At least the data before the update or the data after the update is compensated by this method.

A data update will be described below with reference to FIGS. 15 and 16.

A case wherein a data string A is updated to a data string B will be described. First of all, the flag data are checked. Assume that the two flags (FLAG1 and FLAG2) indicate 0 in the initial state. If the two flags do not indicate 0, an error is determined. When an error occurs, the processing is continued in accordance with the values indicated by the two flags. That the two flags do not indicate 0 means that the processing based on the previous command is interrupted.

If the two flags indicate 0 in the initial state, the data string B is generated in the working area and stored in the backup area. As a consequence, FLAG1=1. When the data string B is then stored in the data storage area, FLAG2=1. Thereafter, FLAG0=0 and FLAG2=0, and the initial state is restored.

Each stage in FIG. 3 will be described in more detail next with reference to the flow charts of FIGS. 17 to 36. The following are the contents indicated by the abbreviations in FIGS. 17 to 36:

WTX: wait time extension

WDLEN: constituent unit of definition information (definition information of DF and EF has a predetermined length)

Error: command interruption and error response output $: hexadecimal notation ($80=128 (decimal notation))

Figure 17:
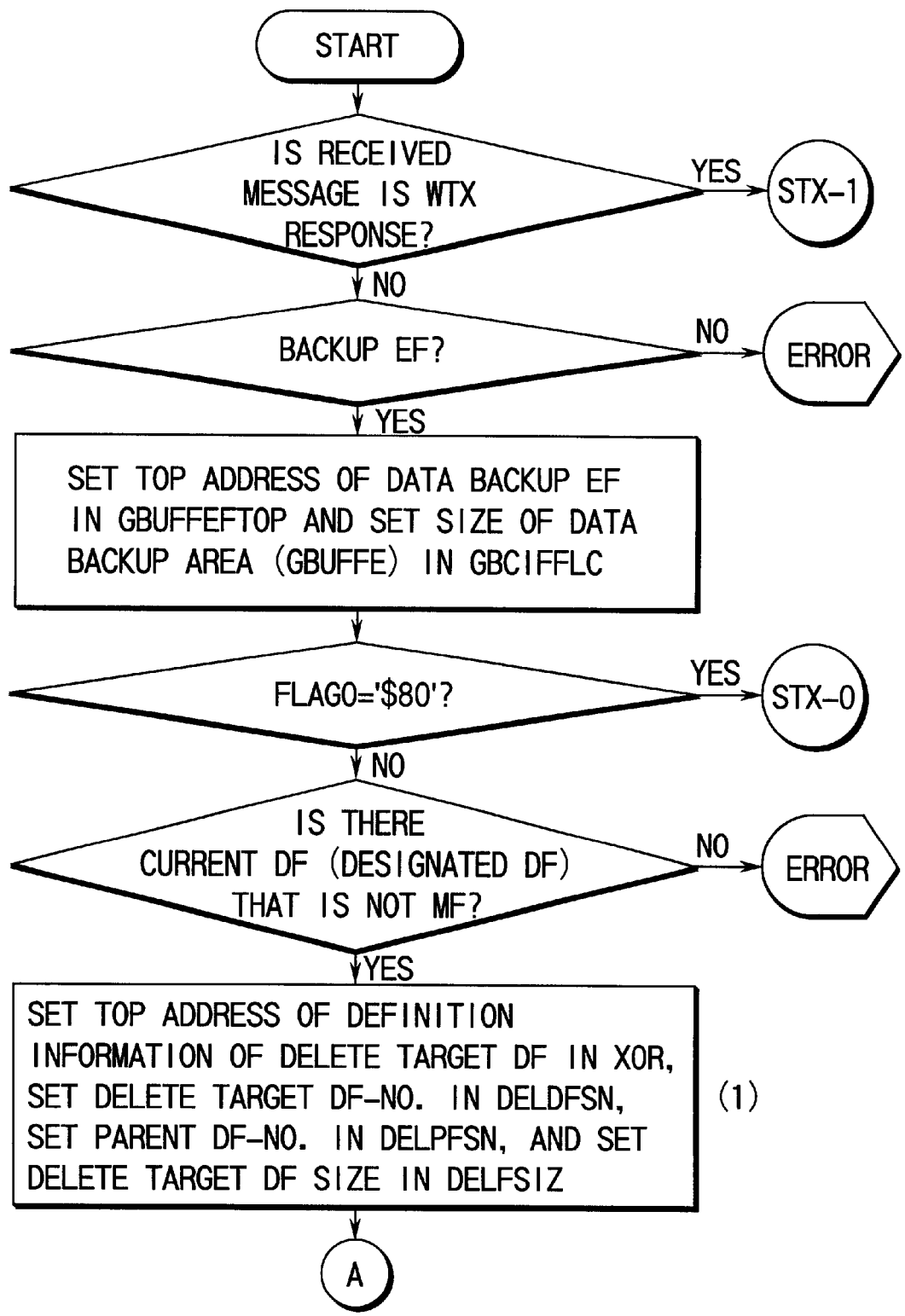
FIG. 17 is a flow chart for explaining stage 00 in the flow chart of FIG. 3.
Figure 18:
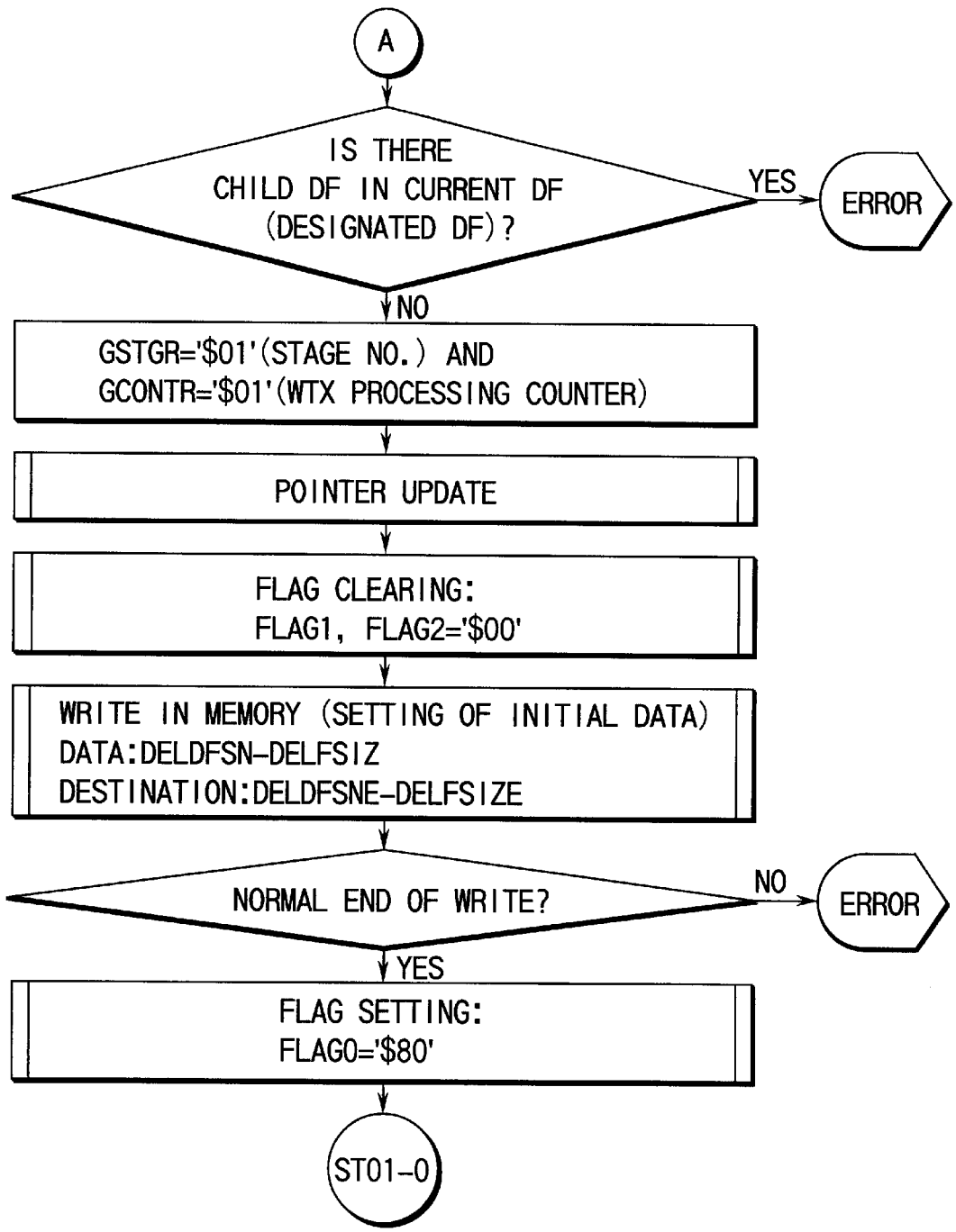
FIG. 18 is a flow chart following the flow chart in FIG. 17 to explain stage 00 in the flow chart of FIG. 3.

Stage 00 in the flow chart of FIG. 3 will be described first with reference to the flow charts of FIGS. 17 and 18.

If a received message is a WTX response, the flow jumps to a WTX response processing routine (STX-1). If the received message is not a WTX response and no data backup EF is present, an error is output. If the received message is not a WTX response and a data backup EF is present, the address (top address) of the data backup EF and the size of the backup area are acquired and stored in the working memory 126 (names: GBUFFEFTOP, GBUFFLC).

If FLAG0 is "$00", the previous command processing is interrupted, and the flow jumps to a command abnormal end processing routine (STX-0). If FLAG0 is not "$00" and the current DF (designated DF) is the MF, an error is output. If FLAG0 is not "$00" and the current DF (designated DF) is not the MF, the sequence number of the delete target DF (current DF), the size of the delete target DF, and the sequence number of the parent DF of the delete target DF are acquired and stored in the working memory 126 (names: DELDFSN, DELPFSN, DELFSIZ). In addition, the address of directory information (definition information) of the delete target DF is stored in the working memory 126 (name: X0R). The flow then advances to "A" in the flow chart. This processing will be described below.

If the current DF (designated DF) has a child DF, an error is output. If the current DF (designated DF) has no child DF, stage number "$01" is stored in the working memory 126 (GSTGR). In addition, "$01" is set in the working memory 126 (GCONTR: WTX processing counter). A pointer update routine is then called, and the data set in the working memory 126 (GSTGR, X0R) are stored in the data memory 124 (GSTGE, X0E in this order). Thereafter, flags FLAG1 and FLAG2 are cleared (FLAG1 and FLAG2="$00").

The data (DELDFSN, DELPFSN, DELFSIZ) in the working memory 126 are stored in the data memory 124 (DELDFSNE, DELPFSNE, DELFSIZE in this order). If a write is not normally performed, an error is output. If the write is normally performed, FLAG0 is set to "$801". The flow then advances to stage 01-0 in the flow chart.

Figure 19:
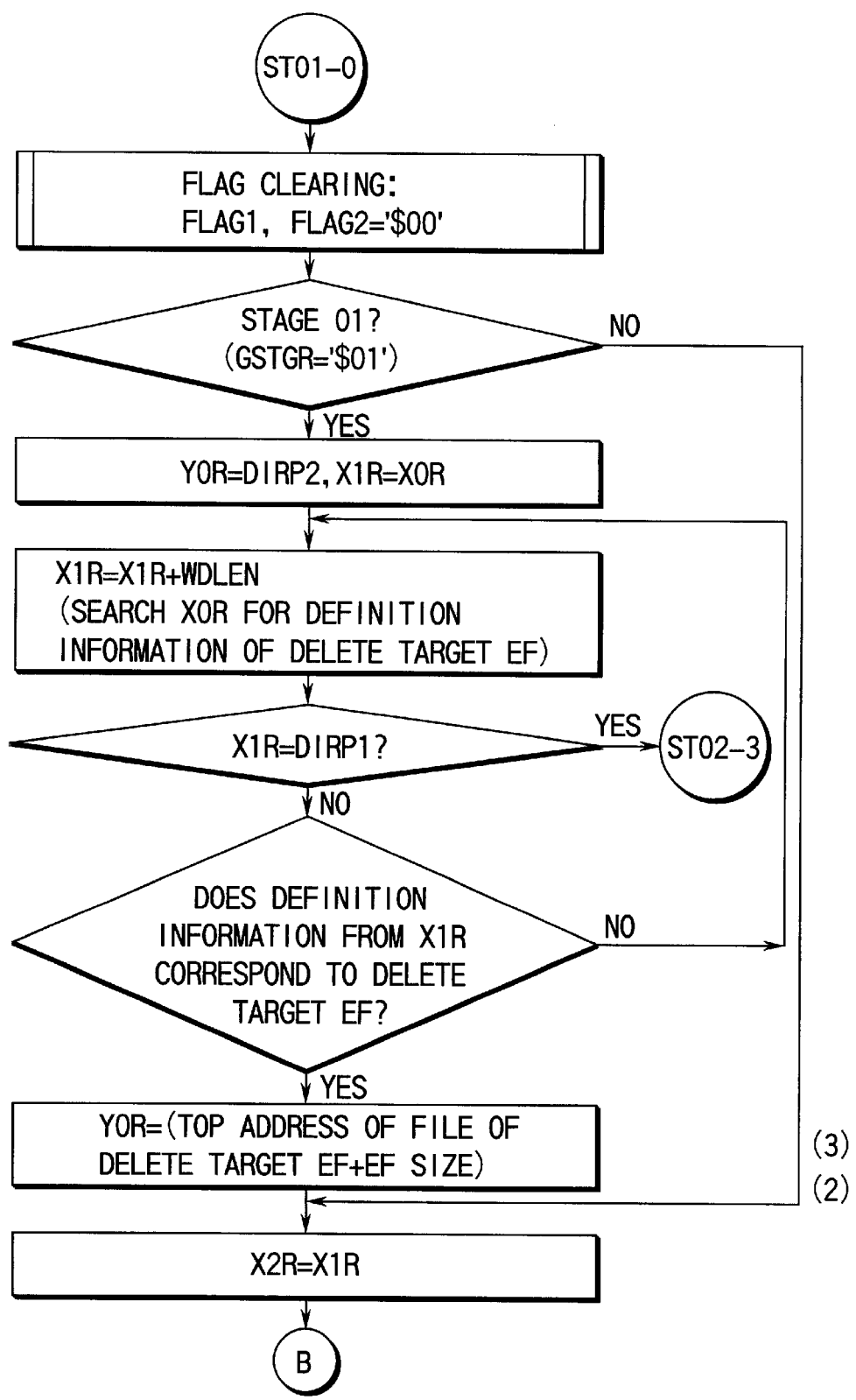
FIG. 19 is a flow chart for explaining stage 01 or 81 in the flow chart of FIG. 3.
Figure 20:
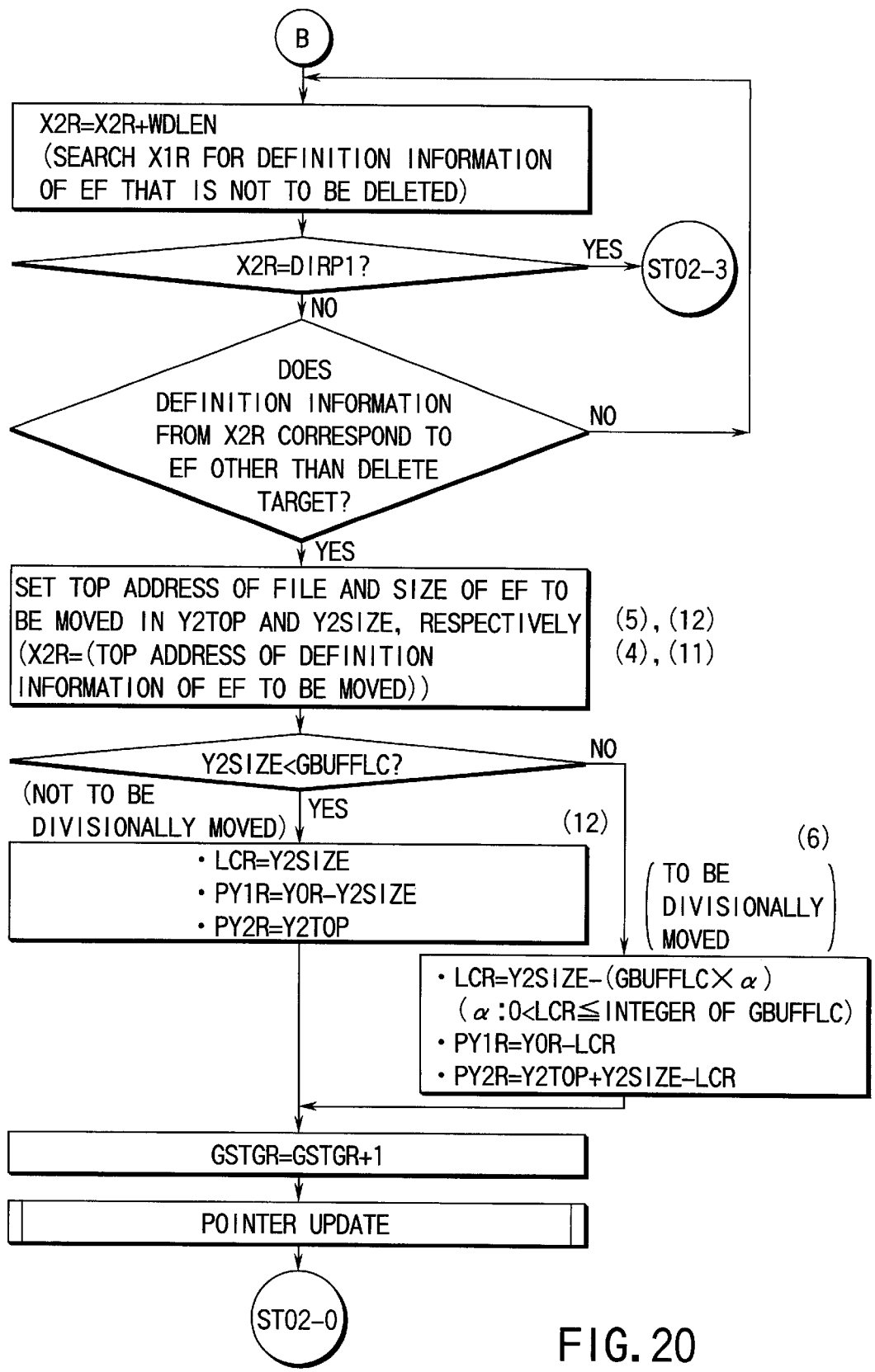
FIG. 20 is a flow chart following the flow chart in FIG. 19 to explain stage 01 or 81 in the flow chart of FIG. 3.

Stage 01 or 81 in the flow chart of FIG. 3 will be described next with reference to the flow charts of FIGS. 19 and 20.

FLAG1 and FLAG2 are cleared (FLAG1 and FLAG2="$00"). If the stage number in the working memory 126 (GSTGR) is "$01", the lowest address (DIRP2) of the data area is set in the working memory 126 (Y0R), and the data in the working memory 126 (X0R) is set in the working memory 126 (X1R). The definition information of a delete target DF is used to search for the definition information of a delete target EF toward upper addresses in units of WDLENS. The searched-out address is stored in the working memory 126 (X1R). If no delete target EF is searched out after the available memory area is searched up to the lowest address (DIRP1), the flow jumps to stage 02-3. If a delete target EF is searched out, a data area for the EF is specified from the definition information of the delete target EF, and the data obtained by adding the EF top address and the EF size is re-stored in the working memory 126 (Y0R). The above operation is performed when the stage number in the working memory 126 (GSTGR) is "$01".

After this operation, a search for the definition information of an EF that is not to be deleted is made toward upper addresses, and the corresponding address is stored in the working memory 126 (X2R) (the flow then shifts to "B" in the flow chart). If no EF that is not to be deleted (moved) after the available memory area is searched up to the lowest address (DIRP1), the flow jumps to stage 02-3. If an EF that is not to be deleted is searched out, the data area top address and size of the EF are specified from the definition information of the EF that is not to be deleted. If the size is equal to or smaller than the size of the data backup area, the data area top address of the EF that is not to be deleted is stored in the working memory 126 (PY2R), and the size of the EF is stored in the working memory 126 (LCR). The data obtained by subtracting the size of the EF that is not to be deleted from the working memory 126 (Y0R) is stored in the working memory 126 (PY1R).

If the size of a delete target EF is lager than the size of the data backup area, the remainder obtained by dividing the size of the delete target EF by the size of the data backup area is stored in the working memory 126 (LCR). The data obtained by subtracting the data in the working memory 126 (LCR) from the working memory 126 (Y0R) is stored in the working memory 126 (PY1R), and the data obtained by subtracting the data obtained by adding the top address of the EF that is not to be deleted and the size from the data in the working memory 126 (LCR) is stored in the working memory 126 (PY2R).

As a consequence, the data are set in the working memory 126 (Y0R, X1R, X2R, PY1R, PY2R, LCR), and the stage number in the working memory 126 (GSTGR) is incremented by one. The pointer update routine is then called, and the data in the working memory 126 (GSTGR, Y0R, X1R, X2R, PY1R, PY2R, LCR) are stored in the data memory 124 (GSTGE, Y0E, X1E, X2E, PY1E, PY2E, LCE). The flow then jumps to ST02-0 in the flow chart.

Figure 21:
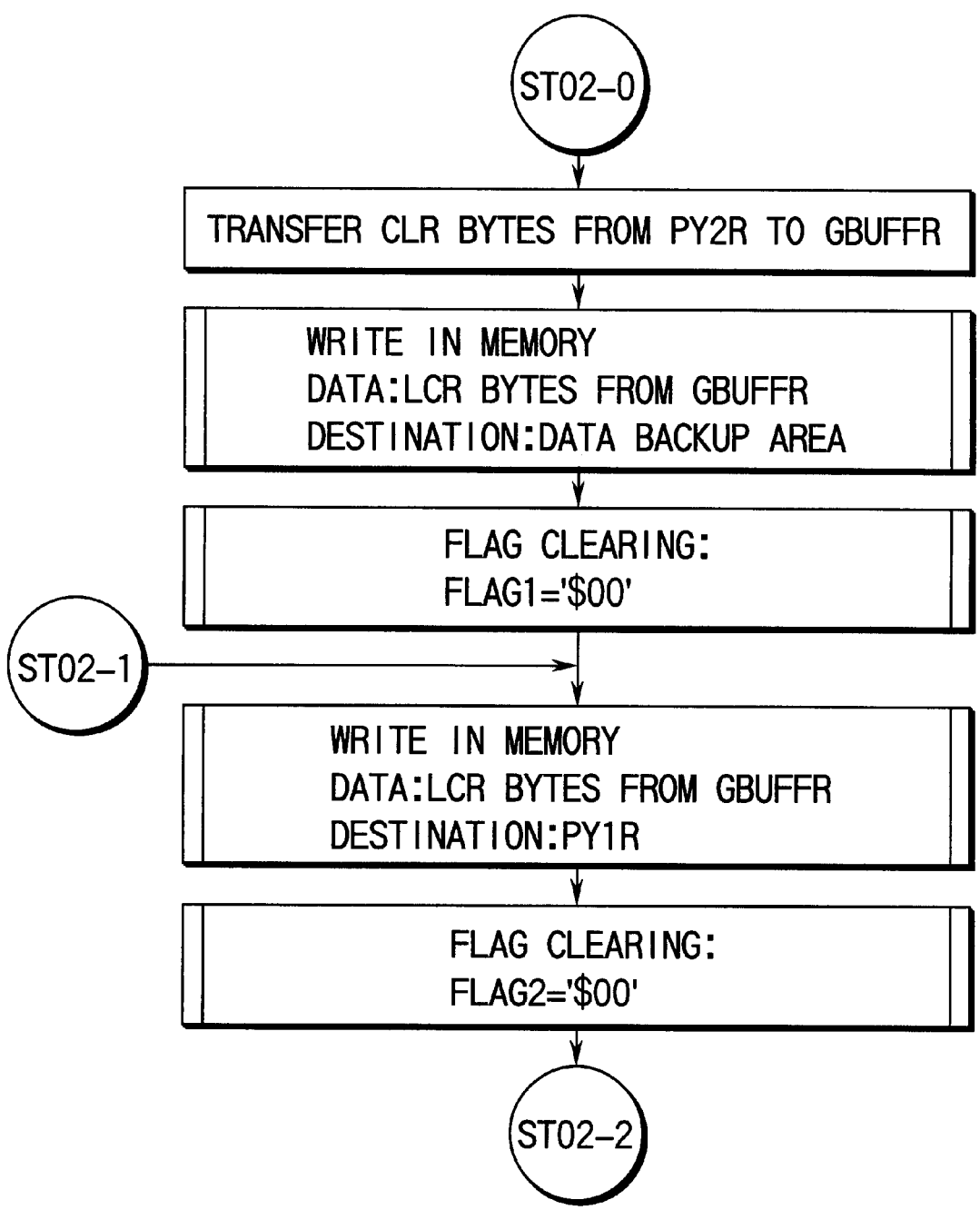
FIG. 21 is a flow chart for explaining stage 02 or 82 in the flow chart of FIG. 3.
Figure 22:
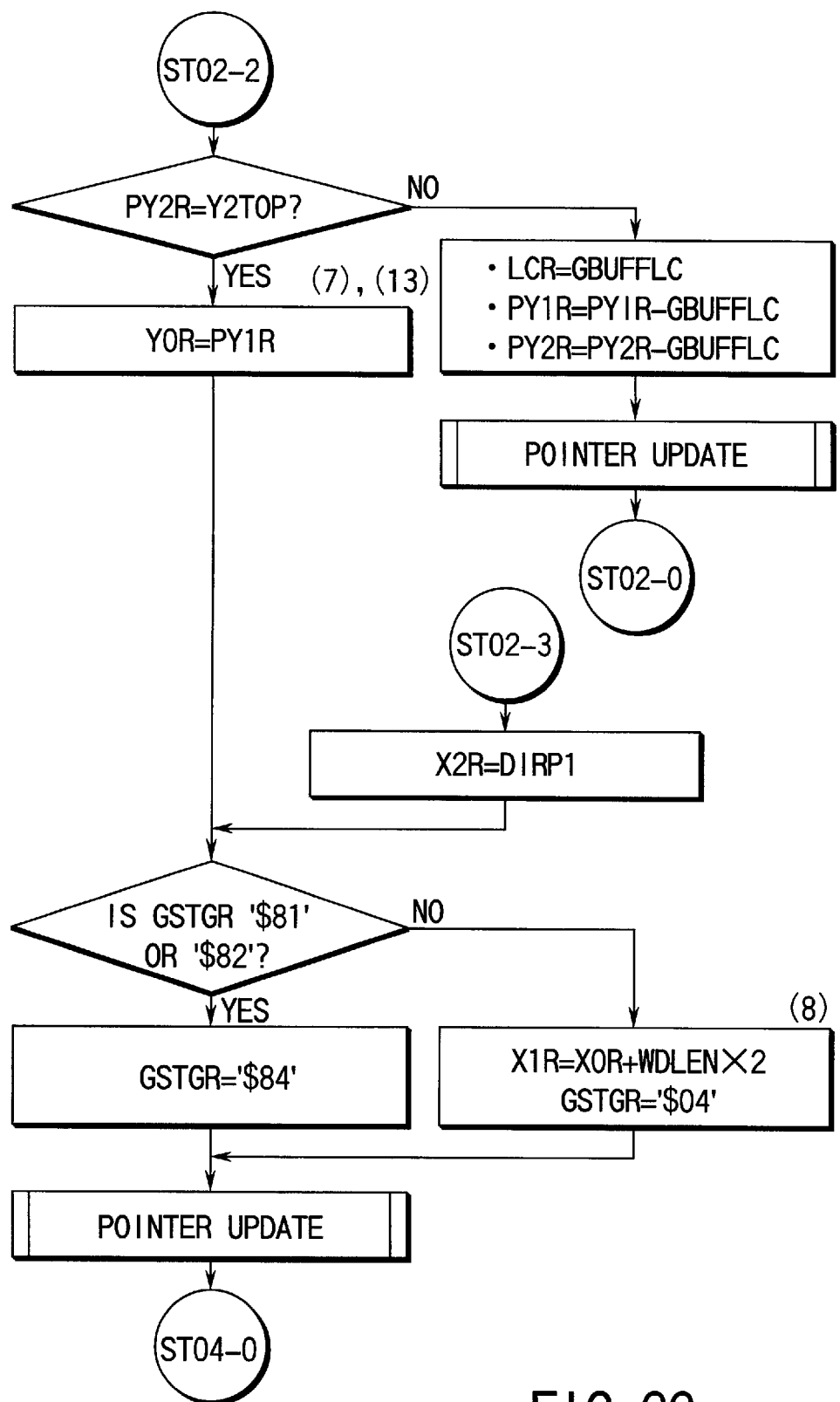
FIG. 22 is a flow chart following the flow chart in FIG. 21 to explain stage 02 or 82 in the flow chart of FIG. 3.

Stages 02 or 82 in the flow chart of FIG. 3 will be described next with reference to the flow charts of FIGS. 21 and 22.

Data corresponding to a byte count indicated in the working memory 126 (LCR) by the address stored in the working memory 126 (PY2R) is stored in the backup area. FLAG1 is then cleared (FLAG1="$00"), and the flow advances to stage 02-1.

In stage 02-1, the backed-up data is stored in the working memory 126 (PY1R). FLAG2 is cleared (FLAG2="$00"), and the flow advances to stage 02-2.

In stage 02-2, if the data in the working memory 126 (PY2R) does not coincide with the top address of the moved EF, i.e., all the data area for the EF that is not to be deleted are not moved, the backup area size is retained in the working memory 126 (LCR), and the data in the 126 (PY1R, PY2R) are decreased by the backup area size. The pointer update routine is then called, and the data (GSTGR, Y0R, X1R, X2R, PY1R, PY2R, LCR) in the working memory 126 are stored in the data memory 124 (GSTGE, Y0E, X1E, X2E, PY1E, PY2E, LCE). The flow jumps to stage 02-2.

If the data in the working memory 126 (PY2R) coincides with the top address of the moved EF, i.e., all the data area for the EF that is not to be deleted are moved, the data in the working memory 126 (Y0R) is changed to the data of the working memory 126 (PY1R). If the stage number in the working memory 126 (GSTGR) is "$81" or "$82", the working memory 126 (GSTGR) is set to "$84". If the stage number in the working memory 126 (GSTGR) is not "$81" or "$82", the data in the working memory 126 (X1R) is set to the sum of the data in the working memory 126 (X0R) and data corresponding to the size (WDLENx2) of the definition information of the delete target directory. As a consequence, the working memory 126 (GSTGR) is set to "$04". The pointer update routine is then called to store the data in the working memory 126 (GSTGR, Y0R, X1R, X2R, PY1R, PY2R, LCR) in the data memory 124 (GSTGE, Y0E, X1E, X2E, PY1E, PY2E, LCE). The flow then jumps to stage 04-0.

In stage 02-3, the lowest address (DIRP1) of the available memory area is stored in the working memory 126 (X2R). The data in the working memory 126 (Y0R) is changed to the data in the working memory 126 (PY1R). If the stage number in the working memory 126 (GSTGR) is "$81" or "$82", the working memory 126 (GSTGR) is set to "$84". The stage number in the working memory 126 (GSTGR) is not "$81" or "$82", the data in the working memory 126 (X1R) is set to the sum of the data in the working memory 126 (X0R) and data corresponding to the size (WDLENx2) of the definition information of the delete target directory, and the working memory 126 (GSTGR) is set to "$04". The pointer update routine is called to store the data in the working memory 126 (GSTGR, Y0R, X1R, X2R, PY1R, PY2R, LCR) in the data memory 124 (GSTGE, Y0E, X1E, X2E, PY1E, PY2E, LCE). The flow then jumps to stage 04-0.

Figure 23:
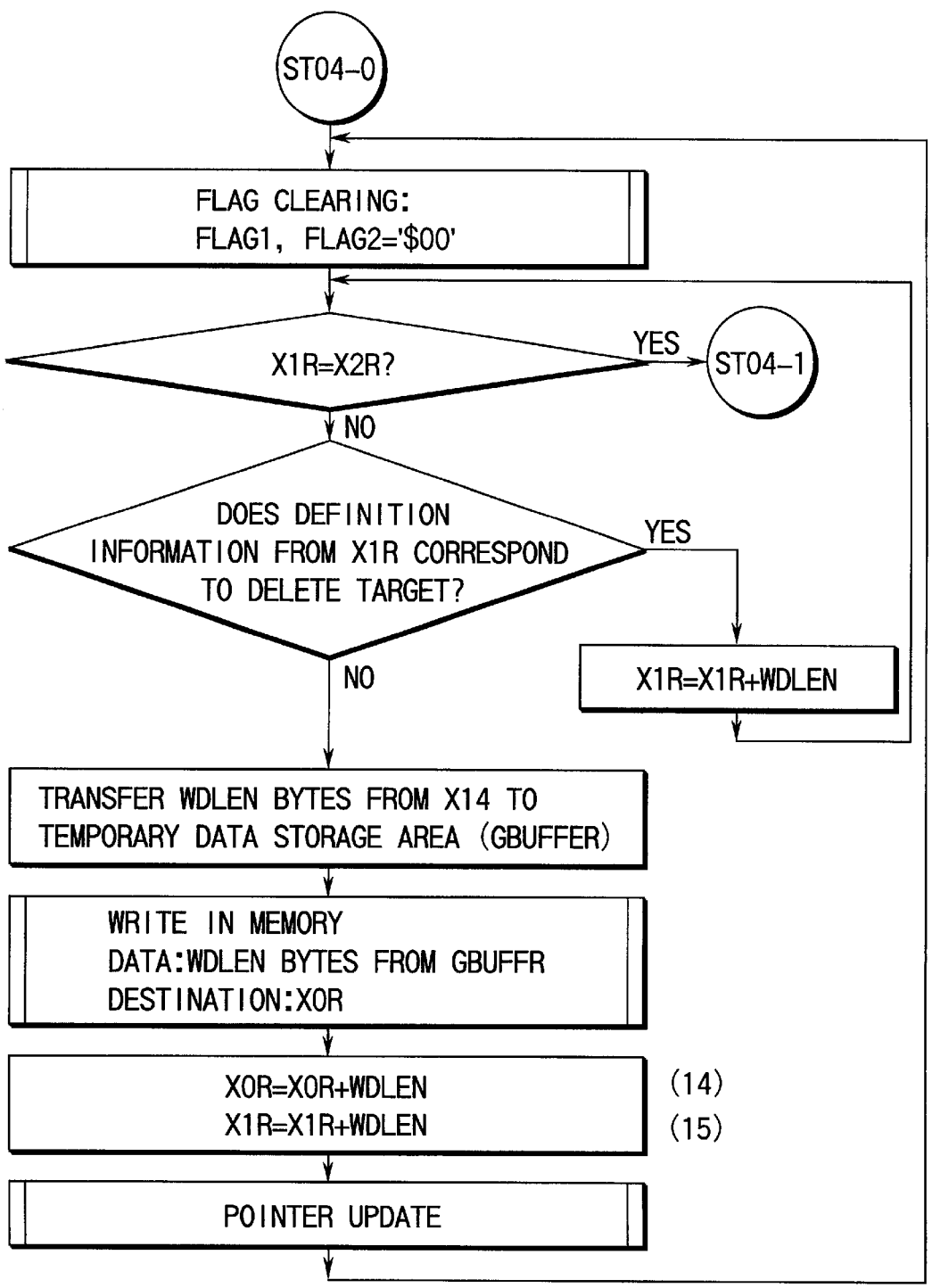
FIG. 23 is a flow chart for explaining stage 04 or 84 in the flow chart of FIG. 3.
Figure 24:
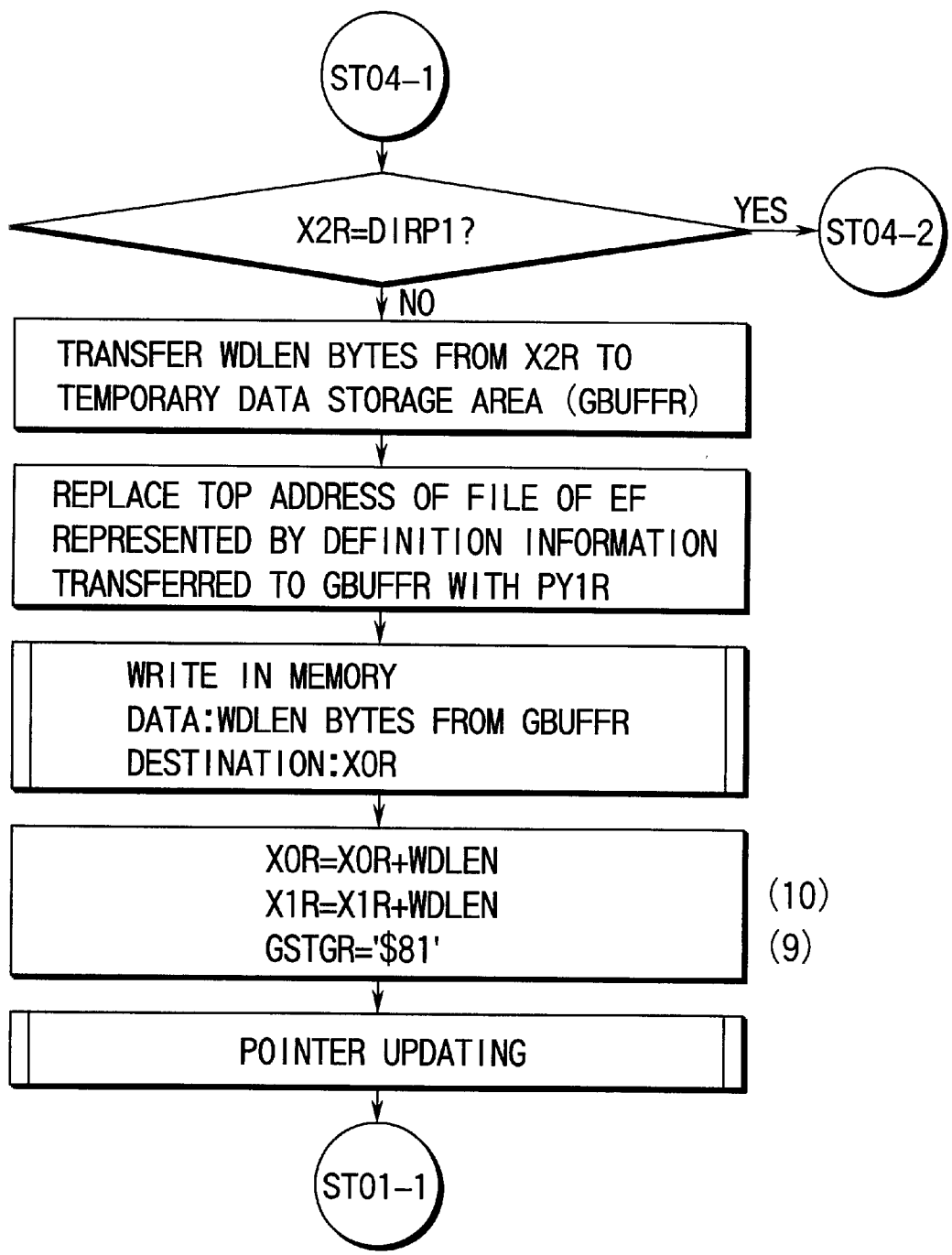
FIG. 24 is a flow chart following the flow chart in FIG. 23 to explain stage 04 or 84 in the flow chart of FIG. 3.
Figure 25:
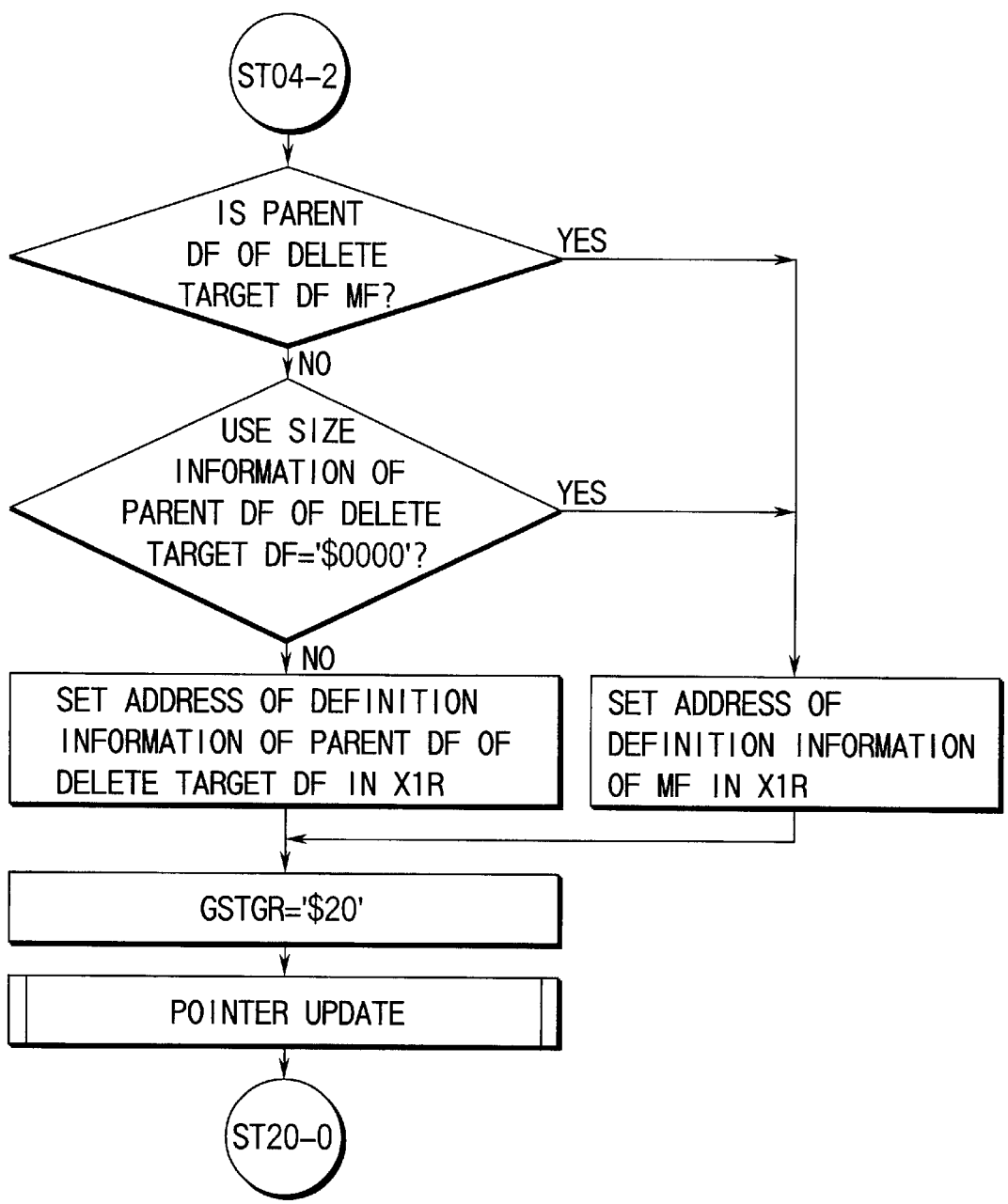
FIG. 25 is a flow chart following the flow chart in FIG. 24 to explain stage 04 or 84 in the flow chart of FIG. 3.

Stage 04 or 84 in the flow chart in FIG. 3 will be described next with reference to the flow charts of FIGS. 23, 24, and 25.

FLAG1 and FLAG2 are cleared (FLAG="$00"). If the data in the working memory 126 (X1R) coincides with the data in the working memory 126 (X2R), the flow jumps to stage 04-1. If the data in the working memory 126 (X1R) differs from the data in the working memory 126 (X2R) and the definition information from the address stored in the working memory 126 (X1R) indicates a delete target, the definition information size is added to the address. The resultant data is re-stored in the working memory 126 (X1R).

If the definition information from the address stored in the working memory 126 (X1R) does not indicate a delete target, the definition information is transferred to the address stored in the working memory 126 (X0R). WDLEN (definition information size) is then added to the address in the working memory 126 (X0R, X1R). The pointer update routine is called to store the data in the working memory 126 (GSTGR, X0R, Y0R, X1R, X2R, PY1R, PY2R, LCR) in the data memory 124 (GSTGE, X0E, Y0E, X1E, X2E, PY1E, PY2E, LCE). Thereafter, the flow returns to stage 04-0.

If it is determined in stage 04-1 that the data in the working memory 126 (X2R) is the lowest address (DIRP1) of the available memory area, the flow jumps to stage 04-2. If the data in the working memory 126 (X2R) is not the lowest address (DIRP1) of the available memory area, the data area top address information of the definition information from the address in the working memory 126 (X2R) is replaced with the data in the working memory 126 (PY1R). The data is then transferred to the address in the working memory 126 (X0R). Data corresponding to the definition information size (WDLEN) is added to the address in the working memory 126 (X0R, X1R), and the working memory 126 (GSTGR) is set to "$81". The pointer update routine is called to store the data in the working memory 126 (GSTGR, X0R, Y0R, X1R, X2R, PY1R, PY2R, LCR) in the data memory 124 (GSTGE, X0E, Y0E, X1E, X2E, PY1E, PY2E, LCE). Thereafter, the flow jumps to stage 01-0.

In stage 04-2, if the parent DF of the delete target DF is not an MF and the use size information of the parent DF of the delete target DF is not set, the address of the definition information of the parent DF of the delete target DF is set in the working memory 126 (X1R). In other cases, the address of the definition information of the MF is set in the working memory 126 (X1R). The stage number in the working memory 126 (GSTGR) is set to "$20". The pointer update routine is then called to store the data in the working memory 126 (GSTGR, X0R, Y0R, X1R, X2R, PY1R, PY2R, and LCR) in the data memory 124 (GSTGE, X0E, Y0E, X1E, X2E, PY1E, PY2E, LCE). Thereafter, the flow advances to stage 20-0.

Figure 26:
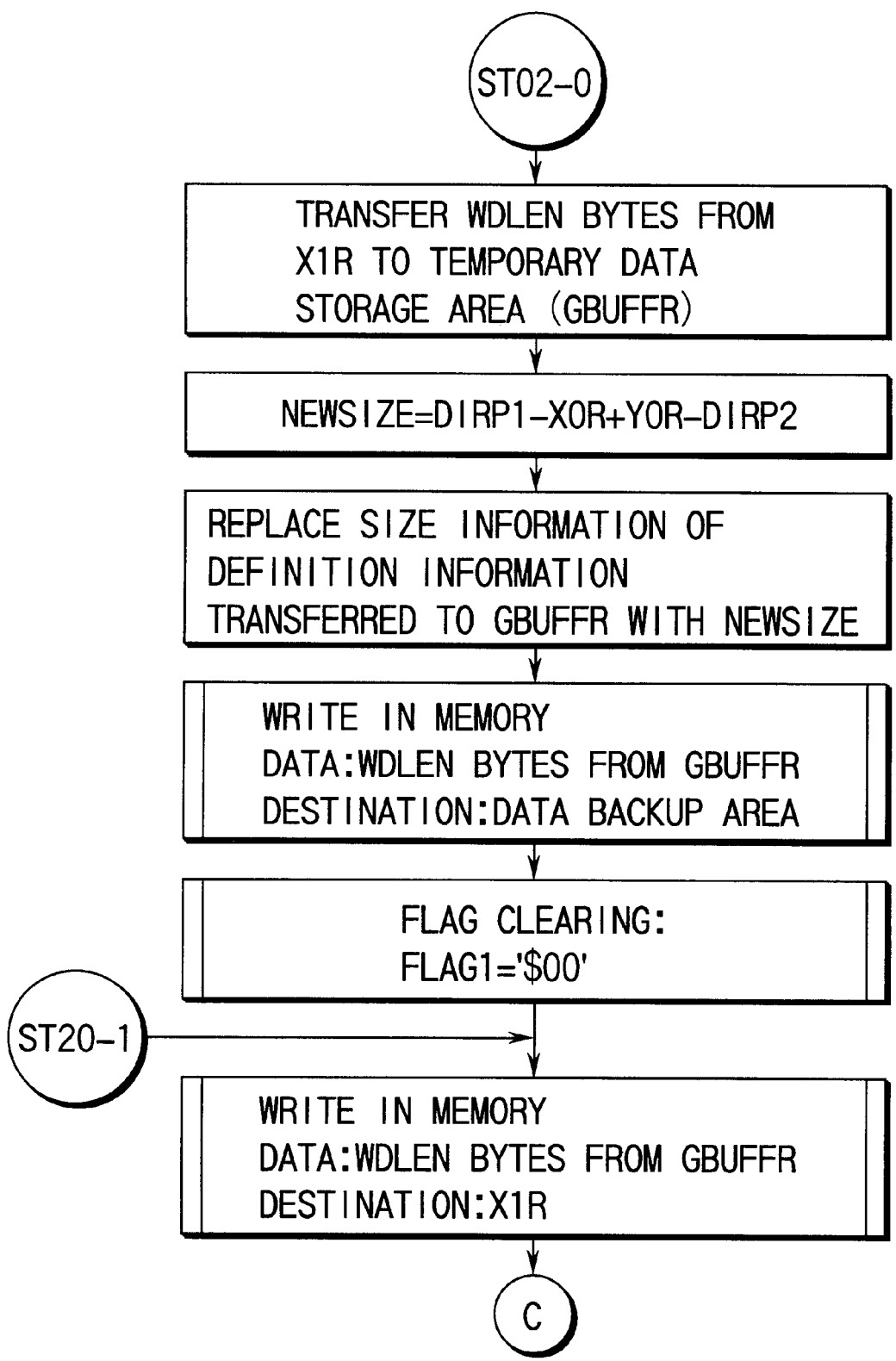
FIG. 26 is a flow chart for explaining stage 20 in the flow chart of FIG. 3.
Figure 27:
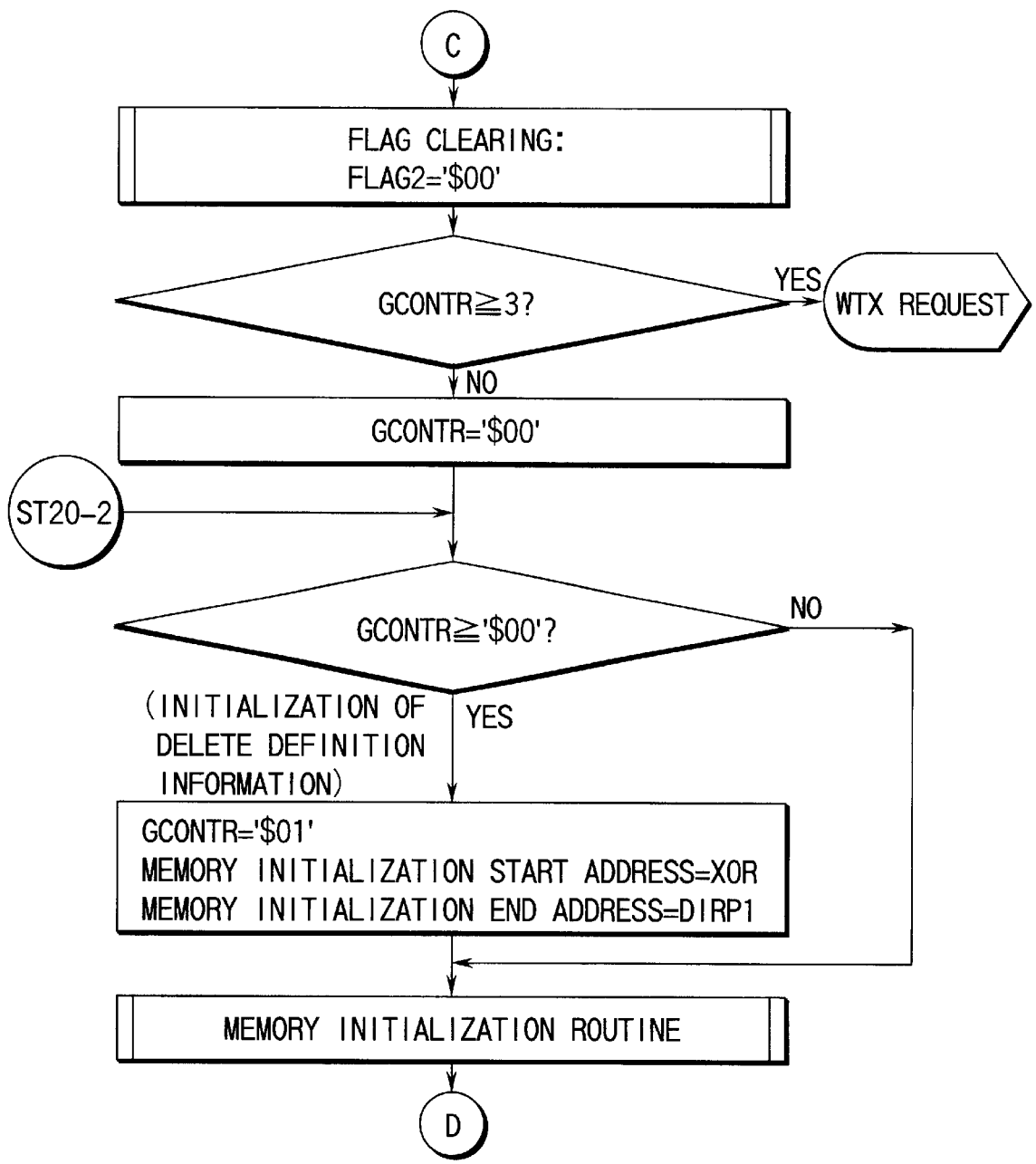
FIG. 27 is a flow chart following the flow chart in FIG. 26 to explain stage 20 in the flow chart of FIG. 3.
Figure 28:
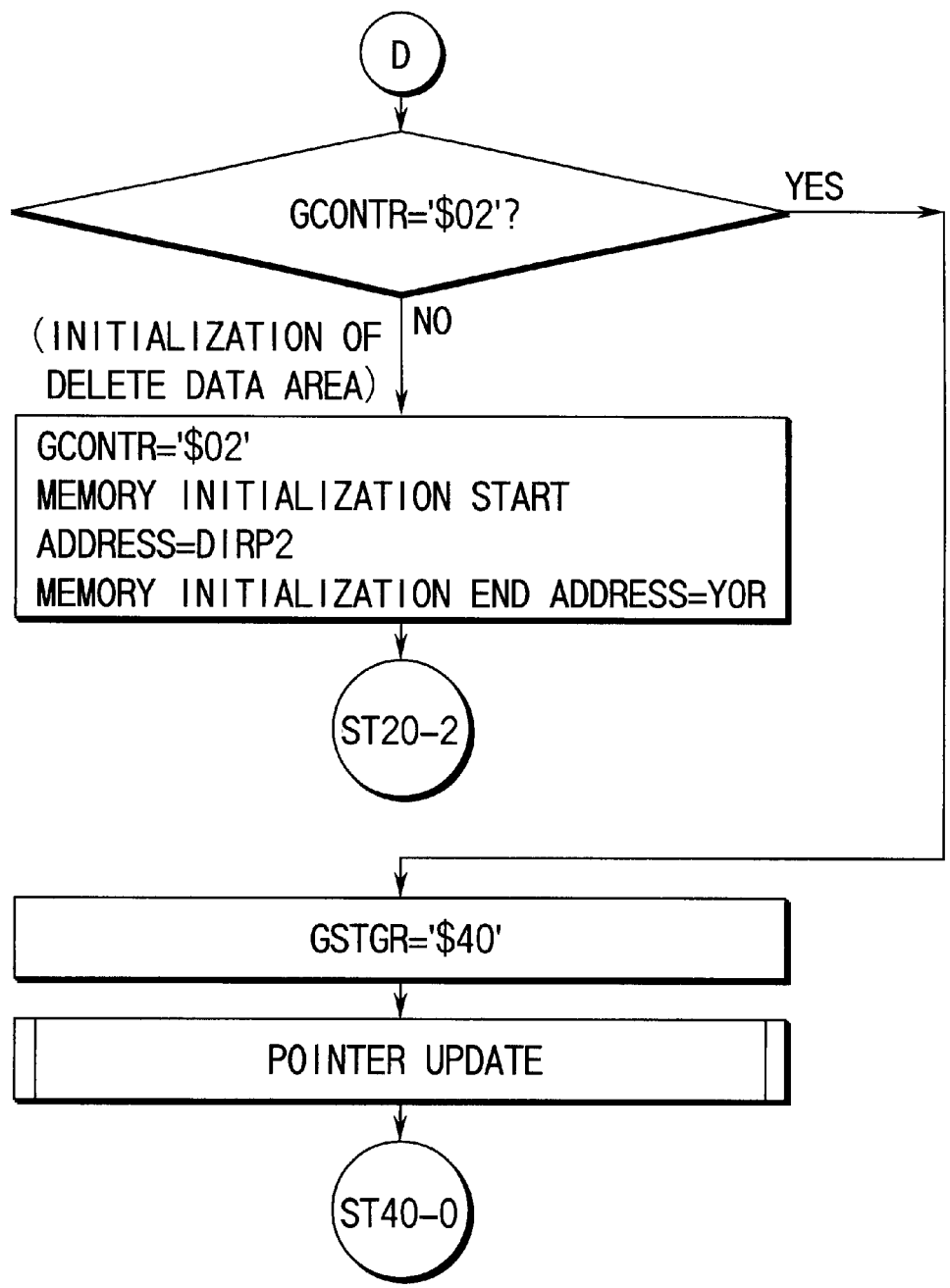
FIG. 28 is a flow chart following the flow chart in FIG. 27 to explain stage 20 in the flow chart of FIG. 3.

Stage 20 in the flow chart of FIG. 3 will be described next with reference to the flow charts of FIGS. 26, 27, and 28.

The use size information from the address in the working memory 126 (X1R) is replaced with the value obtained by subtracting the deleted area size, and the above data is stored in the backup area. FLAG1 is cleared (FLAG1="$00"). The flow then advances to stage 20-1.

In stage 20-1, the data in the backup area is transferred to the address in the working memory 126 (X1R) (the flow then jumps to "C" in the flow chart). FLAG2 is cleared (FLAG2="$00"), and the deleted area is set in a memory initialization state. Every time a predetermined memory area is initialized, a WTX request is generated. The stage number in the working memory 126 (GSTGR) is set to "$40". The pointer update routine is called to store the data in the working memory 126 (GSTGR, X0R, Y0R, X1R, X2R, PY1R, PY2R, LCR) in the data memory 124 (GSTGE, X0E, Y0E, X1E, X2E, PY1E, PY2E, LCE). Thereafter, the flow advances to stage 40.

Figure 29:
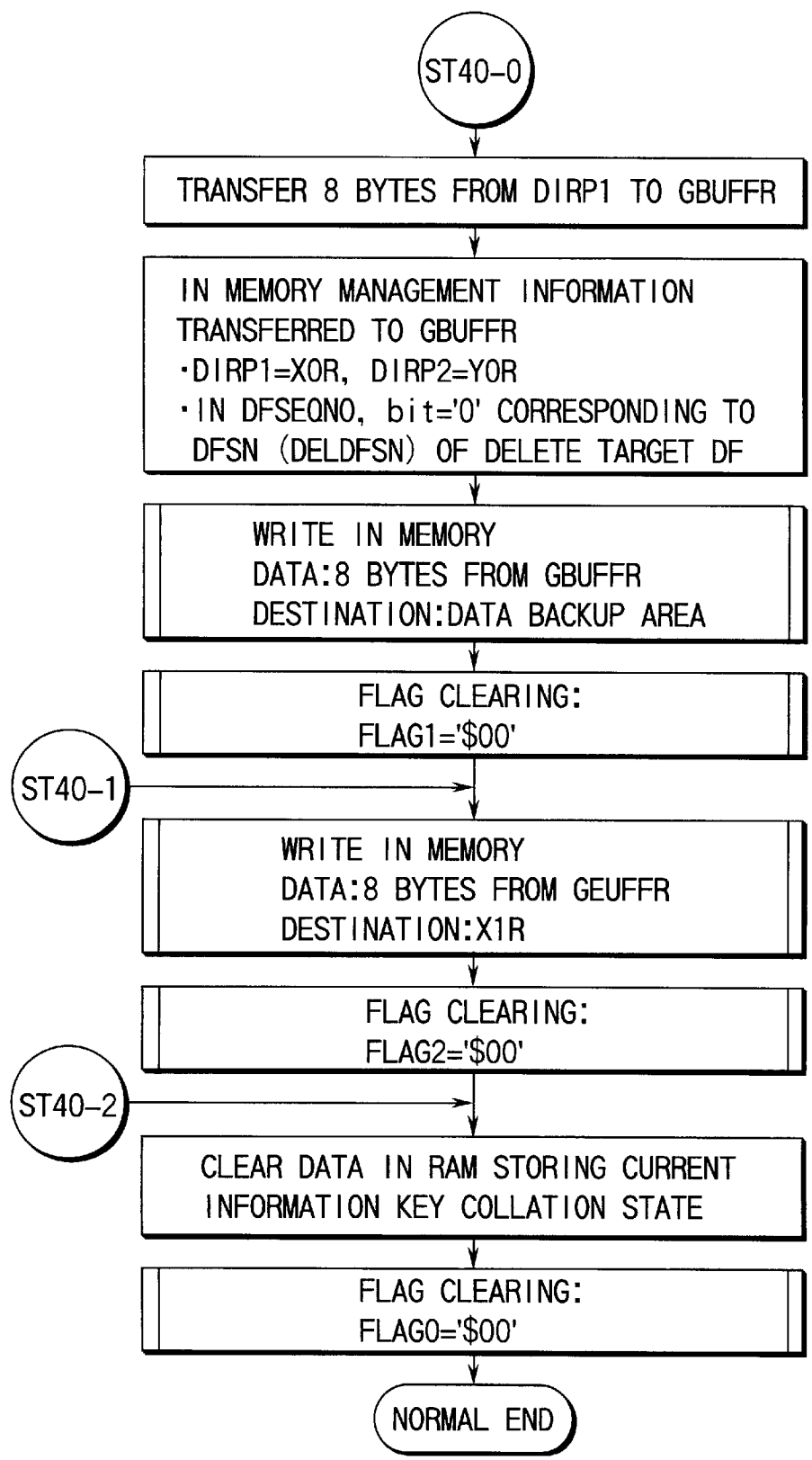
FIG. 29 is a flow chart for explaining stage 40 in the flow chart of FIG. 3.

Stage 40 in the flow chart of FIG. 3 will be described next with reference to the flow chart of FIG. 29.

The lowest address information (DIRP1) of the available memory area of the memory management information is replaced with the data in the working memory 126 (X0R), and the lowest address information (DIRP2) of the data area of the memory management information is replaced with the data in the working memory 126 (Y0R). The above data are stored in the backup area. FLAG1 is cleared (FLAG1="$00"). The flow then advances to stage 40-1.

In stage 40-1, the data in the backup area is stored in the memory management information area. FLAG2 is cleared (FLAG2="$00"). The flow then advances to stage 40-2.

In stage 40-2, a security status (collation state) acquired from a DF other than an MF is cleared. FLAG0 is cleared (FLAG0="$00"), and the processing normally ends.

Figure 30:
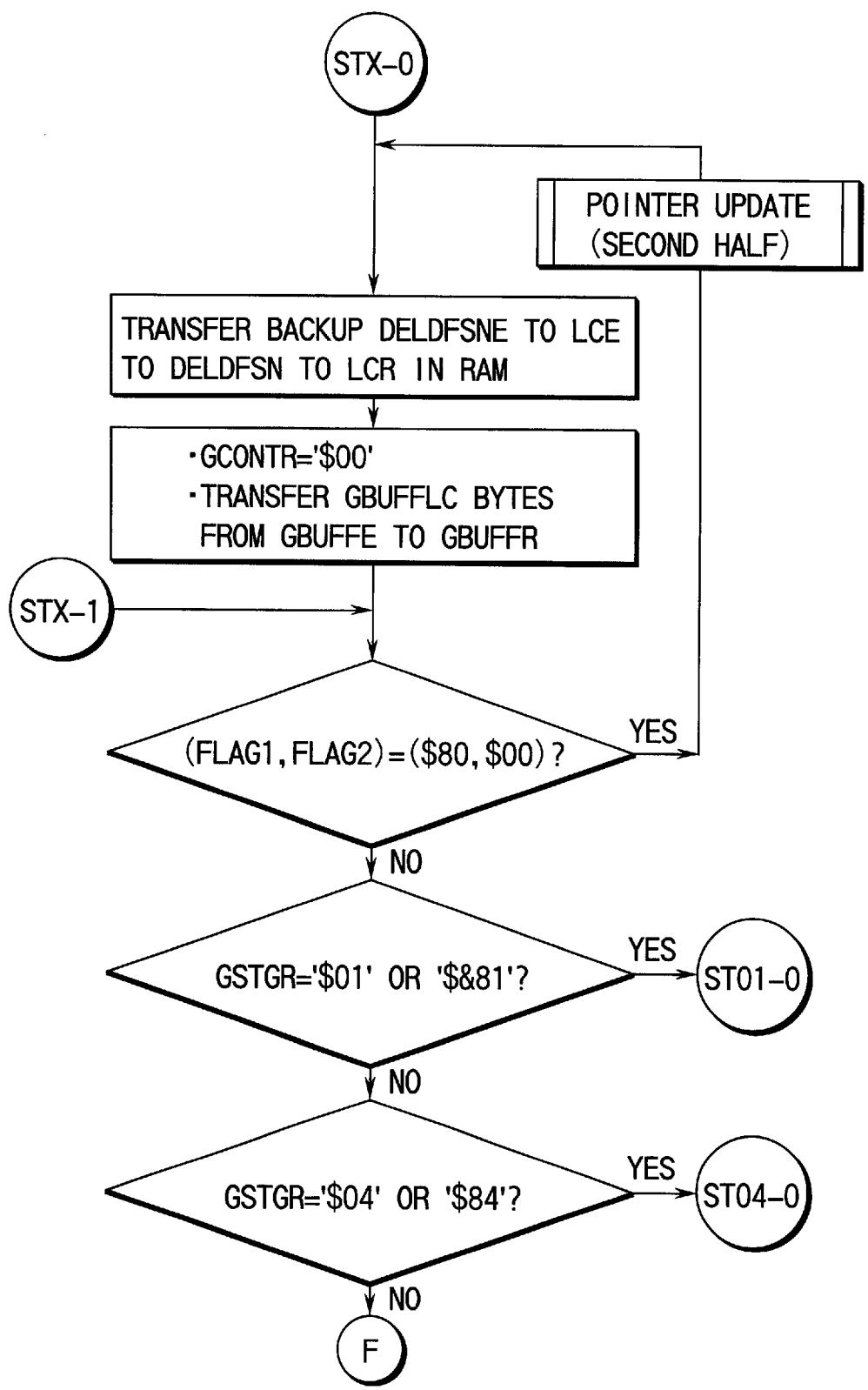
FIG. 30 is a flow chart for explaining a command abnormal end corresponding routine and WTX response processing.
Figure 31:
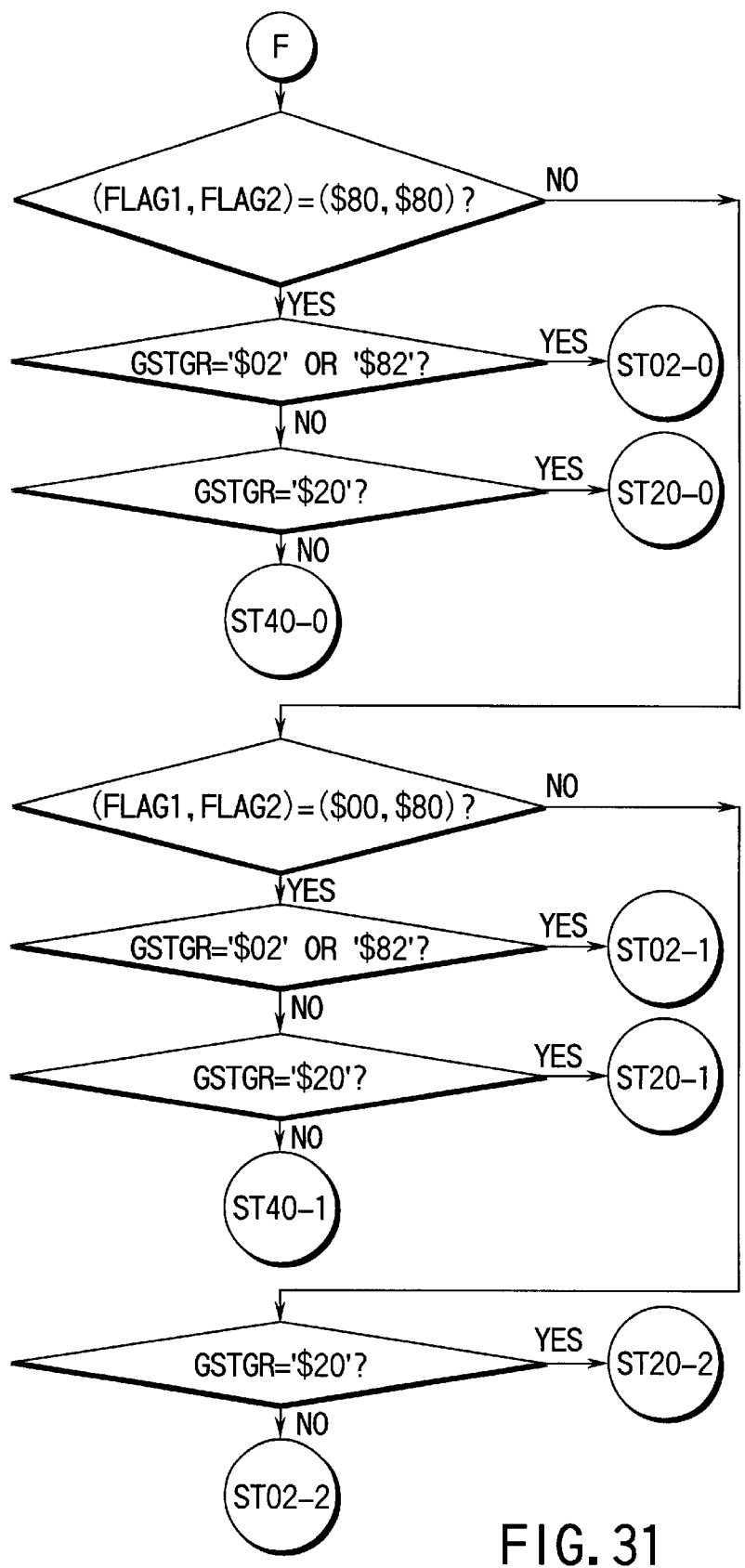
FIG. 31 is a flow chart following the flow chart in FIG. 30 to explain the command abnormal end corresponding routine and WTX response processing.

A command abnormal end corresponding routine and WTX response processing will be described next with reference to the flow charts of FIGS. 30 and 31.

The data in the data memory 124 (DELDFSNE, DELPFSNE, DELFSIZE, GSTGE, X0E, Y0E, X1E, X2E, PY1E, PY2E, LCE) are bitmapped in the working memory 126 (DELDFSN, DELPFSN, DELFSIZ, GSTGR, X0R, Y0R, X1R, X2R, PY1R, PY2R, LCR). "$00" which is the initial value of the WTX processing counter is set in the working memory 126 (GCONTR). The flow then advances to the WTX response processing routine (STX-1).

In the WTX response processing routine, if FLAG1= "$80"or FLAG2="$00", the pointer update routine (second half) is called, and the flow jumps to the command abnormal end processing routine. If the data in the working memory 126 (GSTGR) is "$01" or "$81", the flow advances to stage 01-0. If the data in the working memory 126 (GSTGR) is "$04" or "$84", the flow jumps to stage 04-0 (the flow then jumps to "F" in the flow chart).

If FLAG1="$80" and FLAG2="$80" and the data in the working memory 126 (GSTGR) is "$02" or "$82", the flow jumps to stage 02-0. If the data in the working memory 126 (GSTGR) is "$20", the flow jumps to stage 20-0. If the data in the working memory 126 (GSTGR) is "$40", the flow jumps to stage 40-0.

If FLAG1="$00" and FLAG2="$80" and the data in the working memory 126 (GSTGR) is "$02" or "$82", the flow jumps to stage 02-1. If the data in the working memory 126 (GSTGR) is "$20", the flow jumps to stage 20-1. If the data in the working memory 126 (GSTGR) is "$40", the flow jumps to stage 40-1.

If FLAG="$00" and FLAG2="$00" and the data in the working memory 126 (GSTGR) is "$20", the flow jumps to stage 20-2. If the data is "$02" or "$82", the flow jumps to stage 02-2.

A write in the memory will be described next with reference to the flow chart of FIG. 32.

Figure 32:
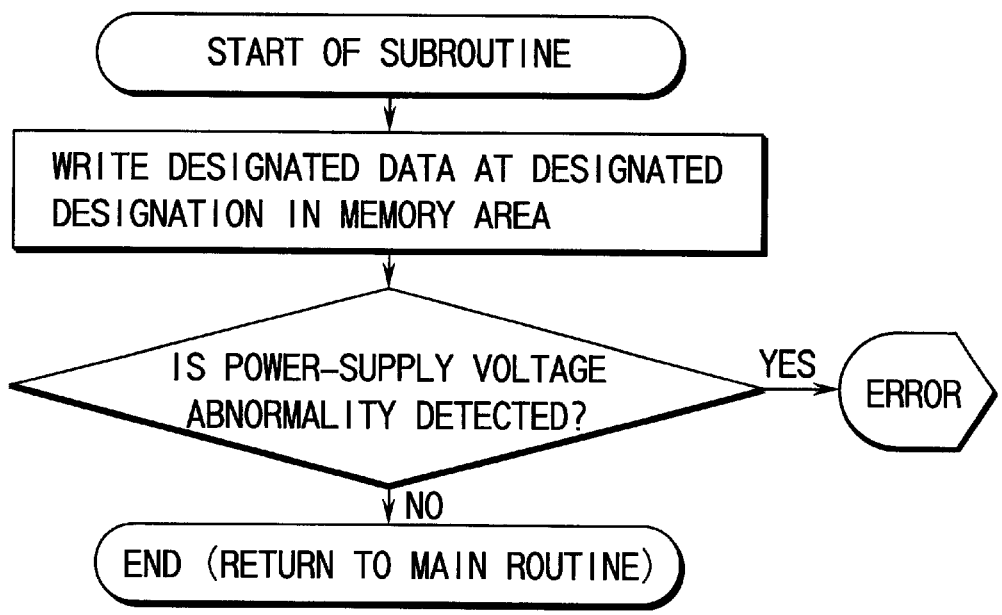
FIG. 32 is a flow chart for explaining a write in the memory.

As indicated by the flow chart of FIG. 32, designated data is written at a target location designated in the memory area. In this case, if a power supply voltage abnormality is detected, an error is output. If no power supply voltage abnormality is detected, the processing in this subroutine ends.

The manner of setting/clearing flags will be described next with reference to the flow chart of FIG. 33.

Figure 33:
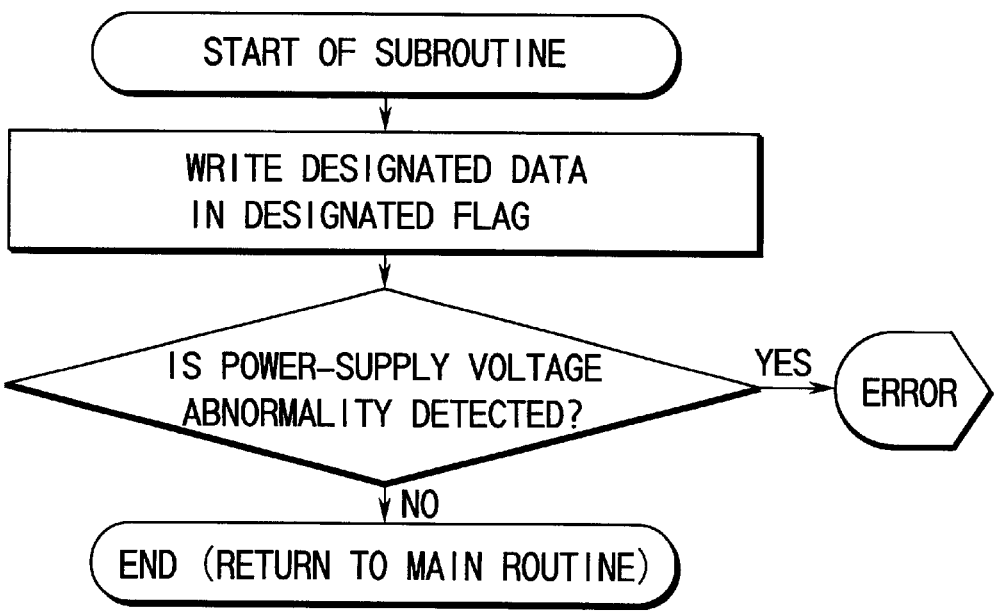
FIG. 33 is a flow chart for explaining the manner of setting/clearing flags.

As indicated by the flow chart of FIG. 33, designated data is written in a designated flag. In this case, if a power supply voltage abnormality is detected, and an error is output. If no power supply voltage abnormality is detected, the processing in this subroutine ends.

Figure 34:
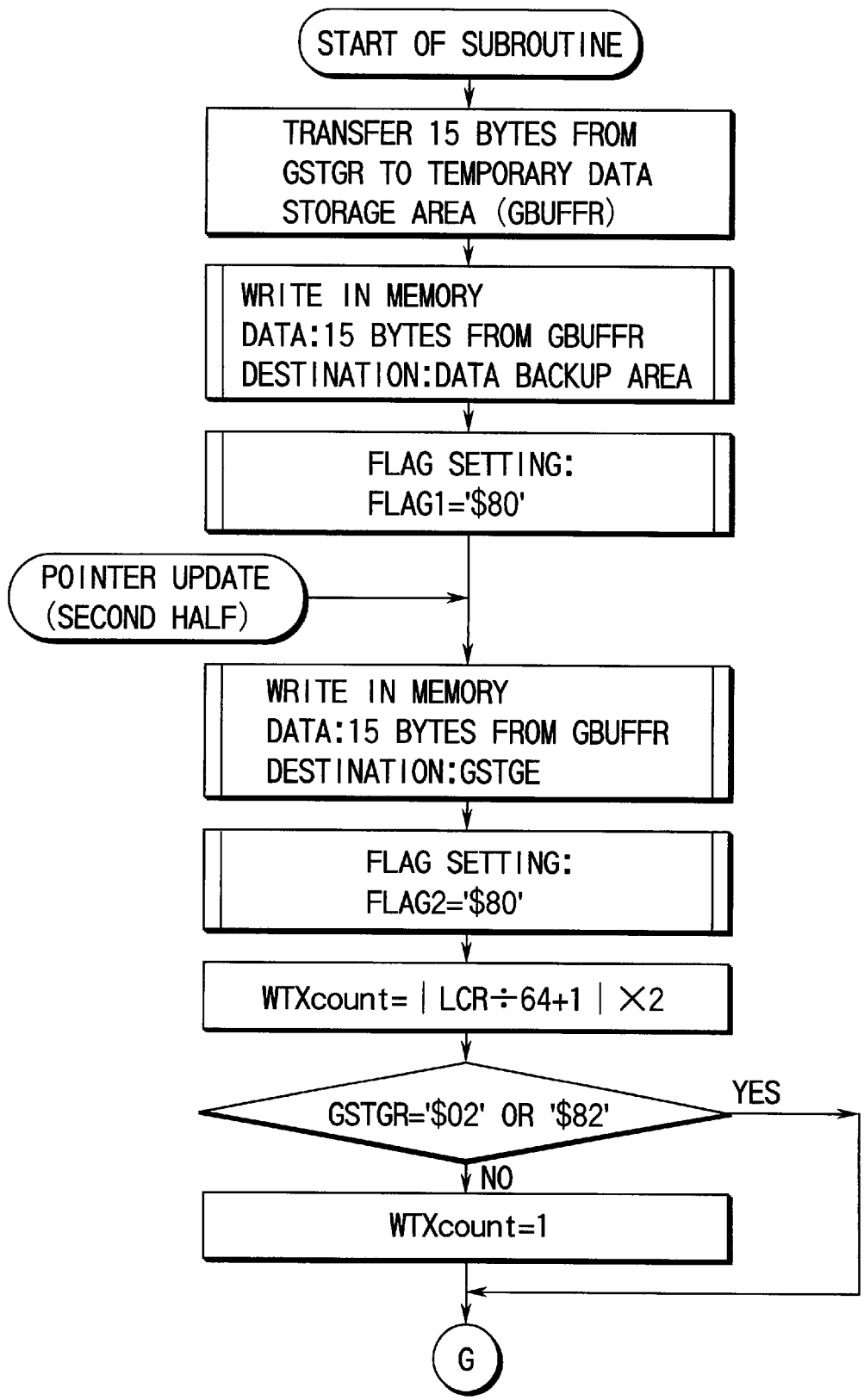
FIG. 34 is a flow chart for explaining a pointer update.
Figure 35:
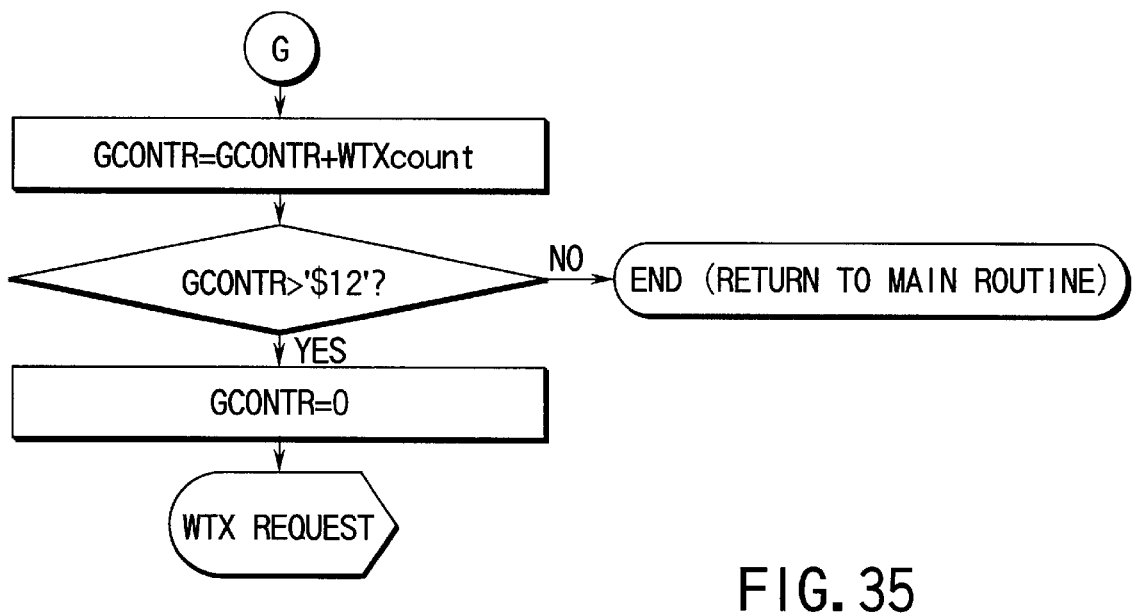
FIG. 35 is a flow chart following the flow chart in FIG. 34 to explain the pointer update.

A pointer update will be described next with reference to the flow charts of FIGS. 34 and 35.

The data in the working memory 126 (GSTGR, X0R, Y0R, X1R, X2R, PY14, PY2R, LCR) are transferred to the working memory 126 (GBUFFR) and stored in the backup area. FLAG1 is set to "$80", and the flow jumps to the pointer update routine (second half).

In the pointer update routine (second half), the data in the backup area is stored from the address of the data memory 124 (GSTGE). FLAG2 is set to "$80". If the data in the working memory 126 (GSTGR) is "$80" or "$82", the data in the working memory 126 (LCR) is multiplied by 64, 1 is added to the resultant data, and the sum is doubled. The resultant data is then added to the data in the working memory 126 (GCONTR). If the stage number in the working memory 126 (GSTGR) is not "$02" or "$82", the data in the working memory 126 (GCONTR) is incremented by one (the flow then jumps to "G" in the flow chart). If the data in the working memory 126 (GCONTR) exceeds "$12", the data in the working memory 126 (GCONTR) is restored to the initial value "$00", and a WTX request is generated. If the data in the working memory 126 (GCONTR) does not exceed "$12", the flow returns to the routine that call this routine.

Memory initialization will be described next with reference to the flow chart of FIG. 36.

Figure 36:
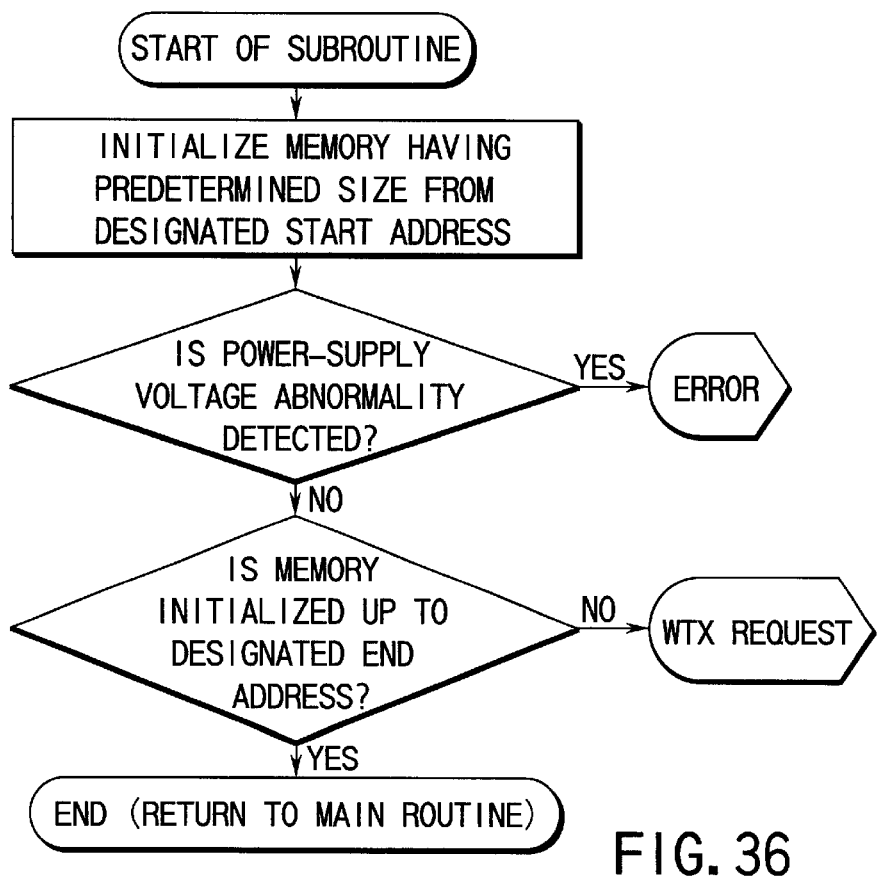
FIG. 36 is a flow chart for explaining memory initialization.

AS shown in the flow chart of FIG. 36, a memory having a predetermined size is initialized from a designated start address. In this case, if a power supply voltage abnormality is detected, and error is output. No power supply voltage abnormality is detected, and the memory is not initialized up to a designated end address, the flow advances to the step of generating a WTX request. If no power supply voltage abnormality is detected, and the memory is initialized to the designated end address, the processing in this subroutine ends.

Flags and execution statuses will be described next with reference to FIG. 37. As shown in FIG. 37, flags (FLAG0, FLAG1, FLAG2) can be rewritten. More specifically, a flag (FLAG0) indicating that processing based on a directory delete command is being executed is rewritten at the beginning and end of the processing. In addition, the pointer and data area are backed up by using flags (FLAG1, FLAG2) other than this flag (FLAG0). Note that "XX" in FIG. 37 represents arbitrary data. Flag data other than the flag data "$80" are handled as "$00".

DF sequence numbers will be described next.

A DF sequence number is used to identify a DF and uniquely assigned to each DF. Conventionally, this DF sequence number is managed with 1 byte (=256 possible values) and incremented every time DF is created. This conventional method cannot satisfactorily support a directory delete command. That is, identical sequence numbers are assigned to DFs after repetitive deletion and addition of DFs.

According to the present invention, therefore, sequence numbers are managed in the bitmap format to allow addition of 32 DFs other than an MF. For example, sequence numbers are managed with 4 bytes (DFSEQNO) of memory management information.

If, for example, DF sequence number 1, number 4, and number 9 are used, the bitmapped data become:

00000000 00000000 00000001 00001001

If the directory corresponding to DF sequence number 9 is deleted in the above state, the bitmapped data become:

00000000 00000000 00000000 00001001

If one directory is created in the above state, DF sequence number 1, number 2, and number 4 are used (when DF sequence numbers are used in the increasing order), the bitmapped data become:

00000000 00000000 00000000 00001011

The above bitmapped data are created by the control section 110 and stored in the data memory 124. That is, the control section 110 functions as a bitmapped data creation means. The data memory 124 functions as a bitmapped data storage means for storing bitmapped data.

WTX will be described next.

Assume that the IC card processing apparatus 200 transmits a command message to the IC card 100. In this case, the processing designated by the received command is executed in the IC card 100. The IC card 100 returns a response indicating the processing result to the IC card processing apparatus 200. The IC card 100 and the IC card processing apparatus 200 exchange such a series of messages.

Assume that when the IC card 100 receives a command message, command processing corresponding to the received command message requires a period of time longer than a predetermined period of time (BWT). In this case, the IC card 100 returns a WTX request (wait time prolongation request) to the IC card processing apparatus 200. In response to this request, the IC card processing apparatus 200 returns a WTX response (wait time prolongation response) to the IC card 100.

DF definition information, MF definition information, and EF definition information will be described next with reference to FIGS. 38 to 40. The abbreviations in FIGS. 38 to 40 will be described first:

WAI: identification information of definition information

DFSN: DF sequence number

PFSN: parent DF sequence number

FSIZ: memory size allocated to DF (when FSIZ=0, no size management is performed)

USIZ: total size of DFs and EFs positioned below DF

EFTOP: start address of EF

EFSIZ: use size allocated to EF

As shown in FIG. 38, DF definition information (length: WDLENx2) includes wAI, PFSN, (other information), DFSN, (DF name and other information), WAI, DFSN, (other information), FSIZ, USIZ, (other information), FSIZ, USIZ, (other information), and the like.

As shown in FIG. 39, MF definition information (length: WDLEN) includes WAI, DFSN, (other information), FSIZ, USIZ, (other information), and the like. Note that the format of this MF definition information is identical to that of the second half of the DF definition information.

As shown in FIG. 40, EF definition information (length: WDLEN) includes WAI, DFSN, (other information), EFTOP, EFSIZ, (other information), and the like.

Deletion of a file to which access is restricted through an access key will be described next.

Assume that an access key required to access EF1-1 in FIG. 4 is stored in EF2-1 in FIG. 4.

In this state, when EF1-1 is to be accessed, the access key input through the input section 240 is collated with the access key stored in the EF2-1. When the two access keys coincide with each other, access to the EF1-1 is permitted. The above collation of access keys and determination of permission of access are performed by the control section 110.

In this state, when EF2-1 is deleted by directory delete processing using a directory delete command, access to EF1-2 is inhibited under the control of the control section 110. That is, the control section 110 functions as a file access management means. This prevents leakage of the information of a file to which access is restricted through an access key.

As has been described above, according to the present invention, there is provided an IC card, IC card processing system, and IC card processing method which can solve the problem of a shortage of memory capacity upon addition of a new application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card having an IC chip, comprising:
   communication means for receiving externally transmitted data;
   storage means for storing a file and definition information of the file;
   delete means for, when the data received through said communication means is a command to delete a predetermined file, deleting the predetermined file and definition information of the predetermined file from said storage means;
   a first location means for, when the definition information is to be stored in said storage means, sequentially locating the definition information from one end of a storage area of said storage means, and, when the file is to be stored in said storage means, sequentially locating the file from the other end of the storage area; and
   a second location means for sequentially relocating the remaining definition information from one end of the storage area to fill an available area generated upon deletion of the definition information by said delete means, and sequentially relocating the remaining file from the other end of the storage area to fill an available area generated upon deletion of the file by said delete means.

2. An IC card according to claim 1, further comprising:
   address management means for managing first address data indicating a first position when the definition information is located at the first position by said first location means, updating the first address data to second address data representing a second position and managing the second address data when the definition information is relocated from the first position to the second position by said second location means, managing third address data indicating a third position when the file is located at the third position by said first location means, and updating the third address data to fourth address data indicating a fourth position and managing the fourth address data when the file is relocated from the third position to the fourth position by said second location means.

3. An IC card according to claim 1, further comprising:
   delete control means for, when the data received through said communication means is a command to delete first and second files, causing said delete means to delete the first file from said storage means, causing said delete means to delete the definition information of the first file after causing said second location means to execute relocation, causing said delete means to delete the second file after causing said second location means to execute relocation, causing said delete means to delete the definition information of the second file after causing said second location means to execute relocation, and causing said second location means to execute relocation, thereby completing execution of the command.

4. An IC card according to claim 1, further comprising:
   log storage means for storing a log of processing performed by said delete means and said first and second location means; and
   log backup means for backing up the log stored in said log storage means.

5. An IC card according to claim 1, further comprising:
   file storage means for storing a first file and a second file holding key data required to access the first file; and
   file access management means for collating key data input upon generation of a request for access to the first file with the key data stored in the second file, permitting access to the first file when the two key data coincide with each other, and inhibiting access to the first file when the second file is deleted by said delete means.

6. An IC card processing method applied to an IC card having an IC chip comprising:
   a first step of receiving externally transmitted data;
   a second step of, when the data received in the first step is a command to delete a predetermined file, deleting the predetermined file and definition information of the predetermined file from a data storage section;
   a third step of, when the definition information is to be stored in said data storage section, sequentially locating the definition information from one end of a storage area of said data storage section, and when the file is to be stored in said data storage section, sequentially locating the file from the other end of the storage area; and
   a fourth step of sequentially relocating the remaining definition information from one end of the storage area to fill an available area generated upon deletion of the definition information in the second step, and sequentially relocating the remaining file from the other end of the storage area to fill an available area generated upon deletion of the file in the second step.

7. A method according to claim 6, further comprising:
   a fifth step of managing first address data indicating a first position when the definition information is located at the first position in the third step, updating the first address data to second address data representing a second position and managing the second address data when the definition information is relocated from the first position to the second position in the fourth step, managing third address data indicating a third position when the file is located at the third position in the third step, and updating the third address data to fourth address data indicating a fourth position and managing the fourth address data when the file is relocated from the third position to the fourth position in the fourth step.

8. A method according to claim 6, further comprising:
   a fifth step of, when the data received in the first step is a command to delete first and second files, deleting the first file from the data storage section in the second step, deleting the definition information of the first file in the second step after executing relocation in the fourth step, deleting the second file in the second step after executing relocation in the fourth step, deleting the definition information of the second file in the second step after executing relocation in the fourth step, and thereby completing execution of the command.

9. A method according to claim 6, further comprising:
   the fifth step of storing a log of processing performed in the second, third, and fourth steps; and the sixth step of backing up the log stored in the fifth step.

10. A method according to claim 6, further comprising the fifth step of collating key data input upon generation of a request for access to the first file with key data stored in the second file, permitting access to the first file when the two key data coincide with each other, and inhibiting access to the first file when the second file is deleted in the second step.

* * * * *